US012537116B2

(12) United States Patent
Simpson et al.

(10) Patent No.: US 12,537,116 B2
(45) Date of Patent: Jan. 27, 2026

(54) ELECTRIC WIRE, METHOD FOR PRODUCING ELECTRIC WIRE, AND MASTERBATCH

(71) Applicants: DAIKIN AMERICA, INC., Orangeburg, NY (US); DAIKIN INDUSTRIES, LTD., Osaka (JP)

(72) Inventors: Wade Martin Simpson, Orangeburg, NY (US); Kazuki Sakami, Osaka (JP); Shinji Murakami, Osaka (JP); Kazuya Kawahara, Osaka (JP)

(73) Assignees: DAIKIN AMERICA, INC., Orangeburg, NY (US); DAIKIN INDUSTRIES, LTD., Osaka (JP)

( * ) Notice: Subject to any disclaimer, the term of this patent is extended or adjusted under 35 U.S.C. 154(b) by 529 days.

(21) Appl. No.: 15/854,490

(22) Filed: Dec. 26, 2017

(65) Prior Publication Data

US 2018/0174708 A1 Jun. 21, 2018

Related U.S. Application Data

(63) Continuation-in-part of application No. PCT/US2017/040038, filed on Jun. 29, 2017.
(Continued)

(51) Int. Cl.
*C08L 27/06* (2006.01)
*B29C 48/00* (2019.01)
(Continued)

(52) U.S. Cl.
CPC ......... *H01B 7/1875* (2013.01); *B29C 48/023* (2019.02); *C08L 23/04* (2013.01);
(Continued)

(58) Field of Classification Search
CPC .......... H01B 7/17; H01B 7/18; H01B 7/1875; H01B 3/305; H01B 3/443; H01B 3/445;
(Continued)

(56) References Cited

U.S. PATENT DOCUMENTS 4,904,735 A * 2/1990 Chapman, Jr. .......... C08L 23/02
525/200
6,077,609 A * 6/2000 Blong ....................... B32B 7/10
428/412

(Continued)

FOREIGN PATENT DOCUMENTS

EP   1 767 583 A1   3/2007
EP   3 012 292 A1   4/2016
(Continued)

OTHER PUBLICATIONS

International Search Report for PCT/US2017/040038 dated Dec. 4, 2017 [PCT/ISA/210].
(Continued)

*Primary Examiner* — Matthew D Matzek
(74) *Attorney, Agent, or Firm* — Sughrue Mion, PLLC

(57) ABSTRACT

The present disclosure provides an electric wire having excellent smoothness, appearance, and storage stability. The electric wire includes a core wire and a coating layer covering the core wire. The coating layer contains a fluorine-free resin and a fluorine-containing crystalline polymer. The fluorine-free resin includes at least one selected from the group consisting of polyamide resins, polyolefin resins, and polyvinyl chloride resin. The fluorine-containing crystalline polymer represents 0.5 to 4.0 mass % relative to the fluorine-free resin.

3 Claims, 9 Drawing Sheets

Related U.S. Application Data

(60) Provisional application No. 62/357,830, filed on Jul. 1, 2016.

(51) Int. Cl.

| | | |
|---|---|---|
| *C08L 23/04* | (2006.01) | |
| *C08L 23/10* | (2006.01) | |
| *C08L 67/02* | (2006.01) | |
| *C08L 77/02* | (2006.01) | |
| *C09D 177/02* | (2006.01) | |
| *H01B 3/30* | (2006.01) | |
| *H01B 3/44* | (2006.01) | |
| *H01B 3/46* | (2006.01) | |
| *H01B 7/00* | (2006.01) | |
| *H01B 7/02* | (2006.01) | |
| *H01B 7/18* | (2006.01) | |
| *H01B 7/29* | (2006.01) | |
| *H01B 13/14* | (2006.01) | |
| *H01B 13/24* | (2006.01) | |
| *B29C 48/80* | (2019.01) | |

(52) U.S. Cl.
CPC ............... *C08L 23/10* (2013.01); *C08L 27/06* (2013.01); *C08L 67/02* (2013.01); *C08L 77/02* (2013.01); *C09D 177/02* (2013.01); *H01B 3/305* (2013.01); *H01B 3/443* (2013.01); *H01B 3/445* (2013.01); *H01B 3/465* (2013.01); *H01B 7/0009* (2013.01); *H01B 7/0216* (2013.01); *H01B 7/292* (2013.01); *H01B 13/145* (2013.01); *H01B 13/24* (2013.01); *B29C 48/802* (2019.02); *C08L 2203/10* (2013.01); *C08L 2203/16* (2013.01); *C08L 2203/202* (2013.01); *C08L 2205/02* (2013.01); *C08L 2205/03* (2013.01)

(58) Field of Classification Search
CPC .... H01B 3/465; H01B 7/0009; H01B 7/0216; H01B 7/292; H01B 13/145; H01B 13/24; C08L 27/12–20; C08L 23/04; C08L 23/10; C08L 27/06; C08L 67/02; C08L 77/02; C08L 2203/10; C08L 2203/16; C08L 2203/202; C08L 2205/02; C08L 2205/03; C09D 127/12–20; C09D 177/02; B29C 48/023; B29C 48/802

USPC ........................................................ 428/383
See application file for complete search history.

(56) References Cited

U.S. PATENT DOCUMENTS

| | | | | |
|---|---|---|---|---|
| 6,794,027 | B1* | 9/2004 | Araki .................... | C09D 127/18 427/385.5 |
| 2003/0236357 | A1* | 12/2003 | Chapman, Jr. .......... | C08L 71/02 525/415 |
| 2004/0192818 | A1* | 9/2004 | Oriani ..................... | C08L 23/04 524/502 |
| 2009/0020914 | A1* | 1/2009 | Nelson ................ | C08L 23/0815 525/88 |
| 2015/0047872 | A1* | 2/2015 | Mori ...................... | H01B 19/00 174/110 PM |
| 2016/0012945 | A1 | 1/2016 | Sasse et al. | |
| 2016/0311954 | A1* | 10/2016 | Okanishi ................. | C08L 23/06 |
| 2016/0322128 | A1* | 11/2016 | Imamura .............. | H01B 7/0275 |
| 2017/0226335 | A1 | 8/2017 | Okanish et al. | |

FOREIGN PATENT DOCUMENTS

| | | | | |
|---|---|---|---|---|
| EP | 3 106 482 A1 | 12/2016 | | |
| JP | 2009-197047 A | 9/2009 | | |
| JP | 2013-251270 A | 12/2013 | | |
| JP | 2015-110716 A | 6/2015 | | |
| WO | 01/27197 A1 | 4/2001 | | |
| WO | WO-2006004013 A1 * | 1/2006 | ............ | B29C 48/09 |
| WO | 2007/081372 A1 | 7/2007 | | |
| WO | 2010/003047 A1 | 1/2010 | | |
| WO | 2015/098867 A1 | 7/2015 | | |
| WO | 2016/027702 A1 | 2/2016 | | |

OTHER PUBLICATIONS

Written Opinion for PCT/US2017/040038 dated Dec. 4, 2017 [PCT/ISA/237].
International Preliminary Report on Patentability with the translation of Written Opinion dated Jun. 30, 2020, from the International Bureau in International Application No. PCT/JP2018/044146.
International Search Report dated Jan. 29, 2019 from the International Searching Authority in Application No. PCT/JP2018/044146.
Communication dated Apr. 20, 2021, from the European Patent Office in European Application No. 18894506.7.

* cited by examiner

ELECTRIC WIRE, METHOD FOR PRODUCING ELECTRIC WIRE, AND MASTERBATCH

CROSS-REFERENCE TO RELATED APPLICATIONS

This application is a Continuation-in-Part of PCT/US2017/040038 filed Jun. 29, 2017 which claims benefit of Provisional Application No. 62/357,830 filed Jul. 1, 2016, the above-noted applications incorporated herein by reference in their entirety.

FIELED OF THE DISCLOSURE

The present disclosure relates to electric wires, methods for producing electric wires, and masterbatch.

BACKGROUND

Installation of power cables used in fields such as the telecommunication field and the construction infrastructure field involves insertion of cables into pipes. However, conventional cables have an outer surface with a high coefficient of friction and generate a high resistance when inserted into pipes. Thus, such cables may be damaged during the work, which means poor insertion workability, In order to solve the above problem, Patent Literature 1 (US 2016/0012945 A1) and Patent Literature 2 (JP 2013-251270 A) achieved reduction in coefficient of friction of cables by adding a fatty acid amide such as erucamide or silicone oil during formation of cables and allowing the fatty acid amide or silicone oil to bleed on the surface, thereby improving the smoothness of the cables against pipes.

SUMMARY

An electric wire having excellent smoothness, appearance, and storage is provided.

In a first aspect, an electric wire is provided, comprising a core wire and a coating layer covering the core wire, the coating layer containing a fluorine-free resin and a fluorine-containing crystalline polymer, the fluorine-free resin including at least one selected from the group consisting of polyamide resins, polyolefin resins, and polyvinyl chloride resin, the fluorine-containing crystalline polymer representing 0.5 to 4.0 mass % relative to the fluorine-free resin.

In a second aspect, a method for producing an electric wire is provided, the method comprising the steps of: (1) mixing a masterbatch containing a fluorine-free resin and a fluorine-containing crystalline polymer with a fluorine-free resin to provide a coating composition; and (2) melt-extruding the coating composition onto a core wire to form a coating layer on the core wire, the fluorine-free resin including at least one selected from the group consisting of polyamide resins, polyolefin resins, and polyvinyl chloride resin, the fluorine-containing crystalline polymer in the masterbatch representing 5.0 to 50.0 mass % relative to the fluorine-free resin in the masterbatch, the fluorine-containing crystalline polymer in the coating layer representing 0.5 to 4.0 mass % relative to the fluorine-free resin in the coating layer.

In a third aspect, a masterbatch for forming a coating layeron a core wire of an electric wire is provided, the masterbatch comprising a fluorine-free resin and a fluorine-containing crystalline polymer, the fluorine-free resin including at least one selected from the group consisting of polyamide resins, polyolefin resins, and polyvinyl chloride resin, the fluorine-containing crystalline polymer representing 5.0 to 50.0 mass % relative to the fluorine-free resin.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

DETAILED DESCRIPTION

A. DEFINITIONS

Figure 1:
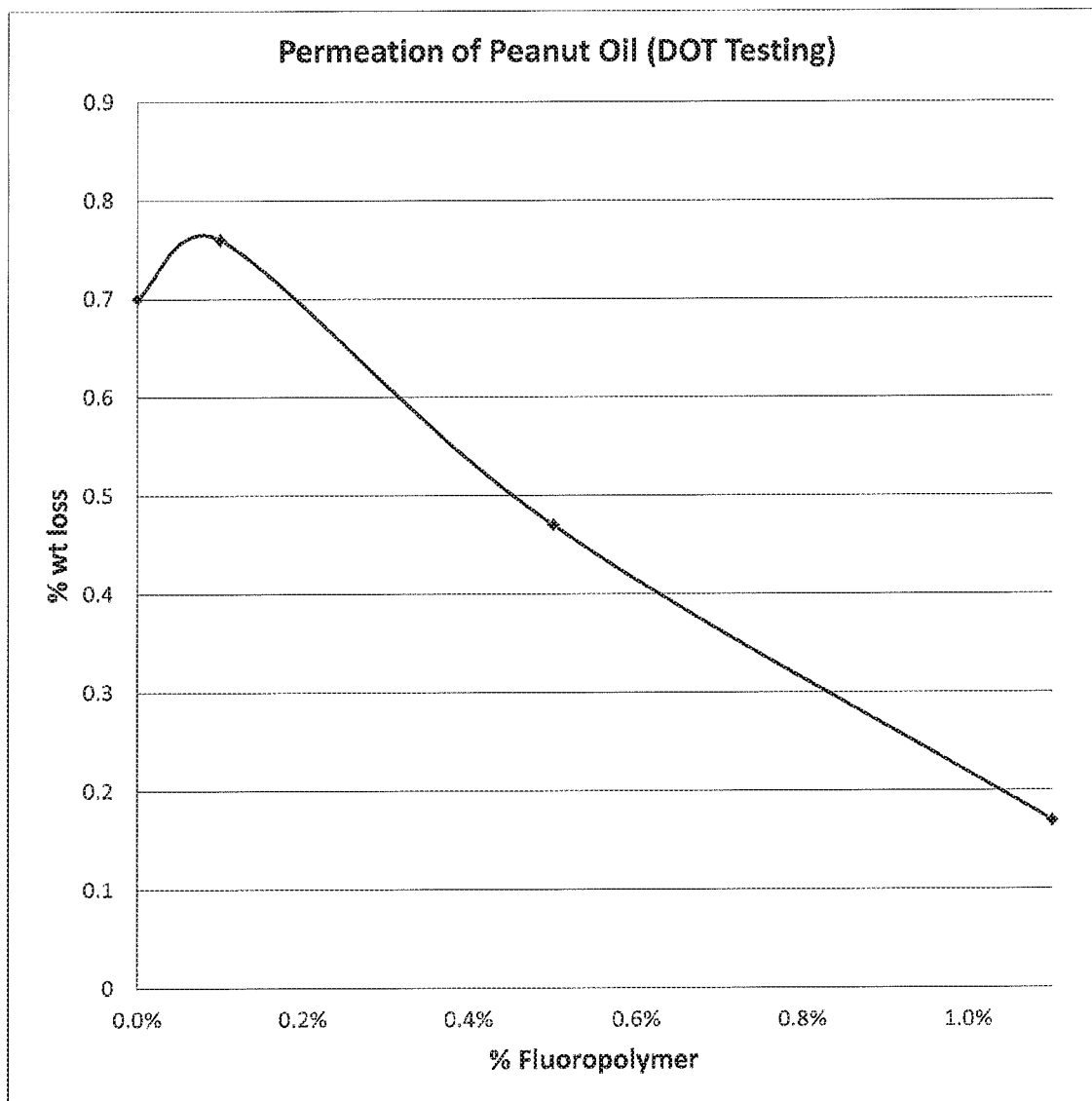
FIG. 1. Percentage weight loss from peanut oil (4:1 FA/StA)/HDPE thermoplastic blends after 28 days at 50° C.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terminology used herein is for the purpose of describing particular embodiments only and is not intended to be limiting. As used herein, the singular forms "a", "an" and "the" are intended to include the plural forms as well, unless the context clearly indicates otherwise.

The terms "first" and "second" are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. Importantly, this term excludes such other elements that adversely affect the operability of what is claimed for its intended purpose as stated in this disclosure, even if such other elements might not adversely affect the operability of what is claimed for some other purpose.

The terms "about" or "approximately" mean within a range of reasonable error around a central value. Such reasonable error may for example stem from the precision of an instrument or method used to measure the value. The error could also stem from the precision of a method of making a component of a device. Specific examples of such limits of reasonable error are 20%, 10%, 5%, 2.5%, and 1%. Unless specified otherwise, all numerical values described in the specification may be approximate.

This disclosure refers to standard published testing protocols in order to describe certain characteristics of embodiments of the invention. When such reference is not specific to a given version or edition of the standard, the reference is to the most recent standard published as of the filing date,

B. THERMOPLASTIC AND FLUOROPOLYMER BLEND

The present disclosure relates generally to polymer chemistry, specifically to thermoplastics. Such thermoplastics as well as methods of making and methods of use therewith are provided.

Thermoplastics are polymers that become pliable upon heating and harden upon cooling, and are able to repeat these processes without significant loss of performance. They are used in a wide variety of applications. In many such applications the thermoplastic would benefit from reduced adhesion, friction, and penetration by both hydrophilic and hydrophobic materials. Improving the characteristics of thermoplastics by utilizing additional processing equipment such as fluorination, multilayer extrusion or topical application of various materials is expensive and adds to the complication of the process. Fluorination at high temperature has the additional drawback of producing hydrogen fluoride (HF) gas, which is highly toxic and corrosive. Consequently there is a need in the art for thermoplastics with low surface energy and good resistance to chemical penetration, and that preferably do not generate HF gas during processing.

A thermoplastic is provided with low surface energy. Embodiments of the thermoplastic have excellent resistance to chemical penetration, adhesion, and leaching.

A blend of a thermoplastic resin and up to about 5% w/w of a fluoropolymer additive is provided. It has been discovered that extruded blends of thermoplastics and fluoropolymers have unexpectedly low surface energies; without wishing to be bound by any given hypothetical model, it is believed that upon extrusion the surfaces of the resultant form or workpiece are enriched in the fluoropolymer fraction of the blend. The blend therefore performs better than would be expected given the bulk concentration of fluoropolymer. It has been observed that such extruded forms sometimes display spheroidal protrusions on the surface that are enriched in fluoropolymers. The observed fluoropolymer-rich protrusions are about 5-25 μm in diameter. For the purposes of this disclosure, any embodiment of the blend may form spheroidal surface protrusions upon setting, such protrusions having diameters selected from 5, 6, 7, 8, 9, 10, 11, 12, 13, 14, 15, 16, 17, 18, 19, 20, 21, 22, 23, 24, 25 μm, and a range between any two of the foregoing.

The combined fluoropolymer fraction and thermoplastic fraction is at least 80% of the blend. In specific embodiments the combined fluoropolymer fraction and thermoplastic fraction is 85%, 90%, 95%, 98%, 99%, 99.5%, 99.9%, 100% w/w of the blend, about any of the foregoing values, or a range between any two of the forgoing values.

The fluoropolymer additive is one known to be suitable for reducing the surface energy of a solid polymer, Some embodiments of the fluoropolymer additive contain a fluorine-containing polymer selected from the group consisting of: NEOFLON EFEP (Daikin Industries, Osaka, Japan—"EFEP"), polytetrafluoroethylene ("PTFE"), fluorinated ethylene propylene ("HP"), and a polymer comprising a fluorinated polyacrylate ester monomer.

PTFE is polymer of tetrafluoroethylene ($CF_2=CF_2$); under the IUPAC rules of nomenclature PTFE is poly(1,1,2,2-tetrafluoroethylene). Its general structure is

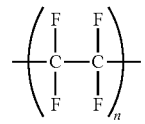

FEP is a copolymer of hexafluoropropylene and tetrafluoroethylene, sometimes with trace amounts of perfluorovinyl ethers, having the general structure

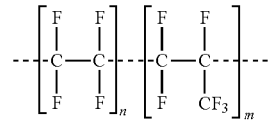

EFEP is a commercially available terpolymer of ethylene, tetrafluoroethylene, and hexafluoropropylene. Unlike many fluoropolymers, EFEP adheres to other surfaces easily.

The fluorine-containing polymer may be a homopolymer of a fluorine-containing polymerizable compound, or a copolymer of a fluorine-containing polymerizable compound and copolymerizable compound (particularly, a fluorine-free polymerizable compound), which are prepared by conventionally known technologies. Some embodiments of the fluorine-containing polymer comprise repeating units derived from a fluorine-containing acrylate ester having the structure of Formula (I) (such polymer referred to herein as "the fluorine-containing acrylate ester polymer"):

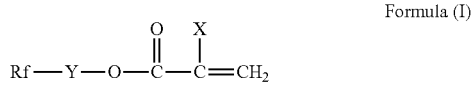

Formula (I)

wherein

X is hydrogen, methyl, fluoro, chloro, bromo, iodo, $CFX^1X^2$ (wherein $X^1$ and $X^2$ are each hydrogen, fluoro, chloro, bromo, or iodo), cyano, straight-chain or branched fluoroalkyl having 1 to 21 carbon atoms, substituted or unsubstituted benzyl, or substituted or unsubstituted phenyl;

is an aliphatic group having 1 to 10 carbon atoms or the like; and

Rf is a straight-chain or branched fluoroalkyl or fluoroalkenyl group having 1 to 6 carbon atoms.

In the fluorine-containing acrylate ester, X is preferably a hydrogen atom or a methyl group. In the formula (I), the Rf group is preferably a perfluoroalkyl or perfluoroalkenyl group. The carbon number of the fluoroalkyl or fluoroalkenyl group is from 1 to 6, for example, from 1 to 4.

Examples of the fluoroalkyl group include $-CF_3$, $-CF_2CF_3$, $-CF_2CF_2CF_3$, $-CF(CF_3)_2$, $CF_2CF_2CF_2CF_3$, $-CF_2CF(CF_3)_2$, $-C(CF_3)_3$, $-(CF_2)_4CF_3$, $-(CF_2)_2CF(CF_3)_2$, $-CF_2C(CF_3)_3$, $CF(CF_3)CF_2CF_2CF_3$, $-(CF_2)_5CF_3$, and $-(CF_2)_3CF(CF_3)_2$.

Examples of the fluoroalkenyl group include $CF=CF_2$, $F_2CF=CF_2$, $(CF_2)_2CF=CF_2$, $-CF_2C(CF_3)=CF_2$, $-CF(CF_3)CF=CF_2$, $-(CF_2)_3CF=CF_2$, $-(CF_3)_2CF=CF_2$, $-(CF_2)_2C(CF_3)=CF_2$, $(CF_2)_4CF=CF_2$, $-(CF_2)_4CF=CF_2$, and $-(CF_2)_3C(CF_3)=CF_2$.

Y is an aliphatic group having 1 to 10 carbon atoms, an aromatic or cycloaliphatic group having 6 to 10 carbon atoms, a $-CH_2CH_2N(R^1)SO_2-$ group (in which $R^1$ is an alkyl group having 1 to 4 carbon atoms) or a $-CH_2CH(OY^1)CH_2-$ group (in which $Y^1$ is a hydrogen atom or an acetyl group). The aliphatic group is preferably an alkylene group (having particularly 1 to 4, for example, 1 or 2 carbon atoms) The aromatic or cycloaliphatic group may be substituted or unsubstituted.

Examples of the fluorine-containing acrylate ester include acrylate esters of the formulas:

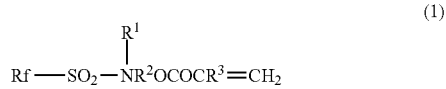 (1)

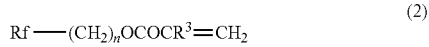 (2)

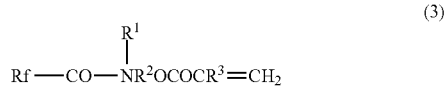 (3)

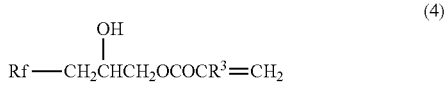 (4)

 (5)

wherein Rf is a perfluoroalkyl group having 1 to 6 carbon atoms,
$R^1$ is hydrogen or an alkyl group having 1 to 10 carbon atoms,
$R^2$ is an alkylene group having 1 to 10 carbon atoms,
$R^3$ is a hydrogen atom or a methyl group,
Ar is an aryl group optionally having a substituent group, and
n is an integer of 1 to 10.

Specific examples of the fluorine-containing acrylate ester include:
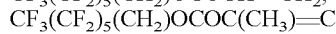
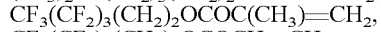
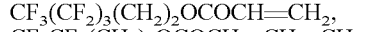
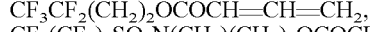
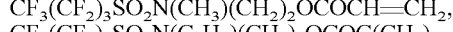
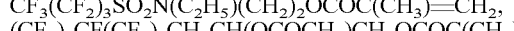
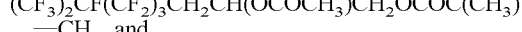
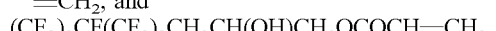
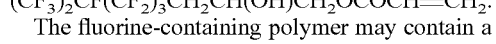

The fluorine-containing polymer may contain a chlorine-containing polymerizable compound as repeating units. The chlorine-containing polymerizable compound is a compound having both a chlorine atom and a carbon-carbon double bond. Examples of the chlorine-containing polymerizable compound are vinyl chloride, vinylidene chloride, alpha-chloroacrylate (for example, an alkyl (having 1 to 30 carbon atoms) ester) and 3-chloro-2-hydroxypropyl methacrylate.

The fluorine-free polymerizable compound may be, for example, a fluorine-free alkyl methacrylate.

The fluorine-free alkyl methacrylate is generally a compound of the formula: $X^1-CX^2=CH_2$ (i) wherein $X^1$ is an alkyl carboxylate group (the alkyl group has 1 to 18 carbon atoms), and $X^2$ is a hydrogen atom or a methyl group.

The fluorine-containing polymer may not contain the fluorine-free alkyl methacrylate in some embodiments.

The other copolymerizable compound may be various. Examples of the other copolymerizable compounds include: (1) acrylic acid and methacrylic acid, and methyl, ethyl, butyl, isobutyl, t-butyl, propyl, 2-ethylhexyl, hexyl, decyl, lauryl, stearyl, isobornyl, hydroxyethyl, glycidyl, phenyl, benzyl and 4-cyanophenyl esters thereof; (2) vinyl esters of fatty acids such as acetic acid, propionic acid, caprylic acid, lauric acid and stearic acid; (3) styrene compounds such as styrene, α-methylstyrene and p-methylstyrene; (4) vinyl and vinylidene halide compounds (excluding chlorides) such as vinyl fluoride, vinyl bromide and vinylidene fluoride; (5) fatty acid allyl esters such as allyl heptanoate, allyl caprylate and allyl caproate; (6) vinyl alkyl ketones such as vinyl methyl ketone and vinyl ethyl ketone; (7) acryl amides such as N-methylacrylamide and N-methylolmethacrylamide; and (8) dienes such as 2,3-dichloro-1,3-butadiene and isoprene, In the fluorine-containing polymer which is the copolymer, the amount of the fluorine-containing polymerizable compound may be at least 10% by weight, for example, from 20 to 80% by weight, particularly from 30 to 60% by weight. In the fluorine-containing polymer, the amount of the chlorine-containing poly. erizable compound is at most 50% by weight, for example, from 0 to 30% by weight, particularly from 0.5 to 25% by weight.

The molecular weight of the fluorine-containing polymer may be generally from 1,000 to 1,000,000, particularly from 3,000 to 50,000 (for example, in terms of polystyrene measured by GPC).

A specific embodiment of the polymer comprising a fluorinated polyacrylate ester monomer is a copolymer ("FA/StA") of an acrylic fluoropolymer ("FA") and stearyl acrylate ("StA").

In some embodiments of the blend, the fluoropolymer additive is present at up to 2% In further embodiments, the fluoropolymer additive is present at up to 1% w/w.

In further embodiments the fluoropolymer is present at w/w concentrations selected from: 100 ppm, 200 ppm, 300 ppm, 400 ppm, 500 ppm, 600 ppm, 700 ppm, 800 ppm, 900 ppm, 0.1%, 0.2%, 0.3%, 0,4%, 0.5%, 0.6%, 0.7%, 0.8%, 0.9%©, 1.0%, 1.1%. 1,2%, 1.3%©, 1.4%, 1.5%, 1.6%, 1.7%, 1.8%, 1.9%, 2.0%, about any of the foregoing, and a range between any two of the foregoing.

The fluoropolymer may be added in various forms, including in a particulate form. The particulate form has the advantage of dispersing in the molten thermoplastic even if the temperature is not high enough to melt the fluoropolymer additive. Some embodiments of the particulate fluoropolymer additive are up to about 150 μm in diameter. Further embodiments are about 60 μm in diameter. Still further embodiments have a mean particle diameter of about 5-15 μm, or more specifically of about 5-10 μm.

Multiple fluoropolymer compounds may be present in the fluoropolymer fraction, For example, the fluoropolymer fraction may comprise two fluoropolymers at relative w/w ratios ranging from 6:1-1:6. Such combinations may include, but are not limited to: FA/StA and EFEP at 6:1, 4:1, 1:1, 1:4, and 1:6 w/w; FA/StA and FEP at 1:1, 2:1, 3:1, 4:1, 5:1 and 6:1; EFEP and PTFE at 1:1, 4:1, and 7:1; EFEP and FEP at 1:1, 4:1, and 7:1; and FA/StA and PTFE at 1:1 and about 10:3 (e.g., 3:1).

The thermoplastic resin may be any polymer that is pliable or moldable above a specific temperature, and solidifies upon cooling, Examples of suitable thermoplastics include polyethylene, high density polyethylene ("HDPE"), highly linear HDPE ("HL HDPE"), low density polyethylene ("LDPE"), linear LDPE ("LLDPE"), polyvinyl chloride ("PVC"), polypropylene ("PP"), and polyamide. The specific the polyamide may be any aliphatic or semi-aromatic polyamide. A specific example of a suitable NYLON polymer is NYLON 6 (PA-6).

Some embodiments of the blend comprise an HDPE thermoplastic and the fluorine-containing acrylate ester polymer. Further such embodiments comprise another fluoropolymer additive selected from the group consisting of: FEP, EFEP, and PTFE.

Some embodiments of the blend comprising an L PE thermoplastic comprise a fluorine-containing polymer selected from: EFEP, PTFE, and a polymer comprising a fluorinated polyacrylate ester monomer.

Some embodiments of the blend comprising a PP thermoplastic comprise a fluorine-containing polymer selected from: FEP, PTFE, and EFEP.

Some embodiments of the blend comprising a PA-6 thermoplastic comprise a fluorine-containing polymer selected from: FEP or PTFE.

Some embodiments of the blend comprising a PVC thermoplastic comprise a polymer comprising a fluorinated polyacrylate ester monomer.

In exemplary embodiments of the blend LLDPE is provided as the thermoplastic and any one of PTFE, FEP, EFEP, and FA/STA is the fluoropolymer fraction. Still in other embodiments, various combinations of PTFE, FEP, EFEP, and FA/STA are used in the fluoropolymer fraction. Examples of such combinations include PTFE combined with FA/StA (e.g. 1:1 by weight) or PTFE combined with EFEP (e.g. 1:1 by weight), In exemplary embodiments of the blend, HDPE is used as the thermoplastic and any one of PTFE, FEP, EFEP, and FA/STA is the fluoropolymer fraction. Still in other embodiments, various combinations of PTFE, FEP, EFEP, and FA/STA are used as the fluoropolymer fraction. Examples of such combinations include PTFE combined with FA/STA (e.g. 1:1 by weight) or PTFE combined with EFEP (e.g. 1:1 by weight).

In exemplary embodiments of the blend, HDPE is used as the thermoplastic and any one of PTFE, FEP, EFEP, and FA/STA is the fluoropolymer fraction. Still in other embodiments, various combinations of PTFE, FEP, EFEP, and FA/STA are used as the fluoropolymer fraction.

In exemplary embodiments of the blend, PP is used as the thermoplastic and any one of PTFE, FEP, EFEP, FA/STA is the fluoropolymer fraction. Still in other embodiments, various combinations of PTFE, FEP, EFEP, and FA/STA are used as the fluoropolymer fraction. Examples of such combinations include FEP combined with EFEP (e.g. 1:1-7 by weight) or PTFE combined with EFEP (e.g. 1:1-7 by weight).

In exemplary embodiments of the blend, PET is used as the thermoplastic and any S one of PTFE, FEP, EFEP, FA/STA is the fluoropolymer fraction. Still in other embodiments, various combinations of PTFE, FEP, EFEP, and FA/STA are used as the fluoropolymer fraction, In exemplary embodiments of the blend, the thermoplastic fraction contains any of LLDPE, LDPE, HDPE, PP, or PET.

C. PROCESS OF MANUFACTURING EXTRUDED WORKPIECE

A process of manufacturing an extruded polymer workpiece is provided, the process comprising: (a)mixing a thermoplastic fraction and up to about 2% w/w of a fluoropolymer fraction to produce a blend, wherein the combined fluoropolymer fraction and thermoplastic fraction is at least 80% w/w of the blend; (b) heating the thermoplastic resin to above the melting temperature of the thermoplastic fraction but below the melting temperature of the fluoropolymer fraction, either before or after step (a); (c) extruding the blend to form an extruded workpiece; and (d) cooling the extruded workpiece below the melting temperature of the blend. The blend may be any disclosed above.

Mixing may be facilitated by exposing the mixture to heat using an oven, drum heater, or other suitable apparatus. If mixing is performed when both the resin and the additive are solid, then some suitable means for blending pellets and/or powder will be used. Mixing can be achieved using a mechanical stirrer or other suitable apparatus. The thermoplastic and fluoropolymer additive may be any that are disclosed above as suitable in the blend.

At least the thermoplastic will be melted during the process. In many cases the fluoropolymer additive will also be melted. In many embodiments, the fluoropolymer additive will not be melted. In such embodiments the fluoropolymer additive may be added in particulate form, as explained above. Particulate fluoropolymer additives have the advantage of allowing solid fluoropolymer additive to disperse in the molten thermoplastic without melting the fluoropolymer. The melting temperatures of these components can be easily ascertained by those of ordinary skill in the art, Extrusion Will be performed according to the type of workpiece to be produced. The table below provides exemplary extruder conditions for various thermoplastics.

|  | Polymer | HDPE | LDPE | HLMI HDPE | PP | PET | PVC | Poly-styrene | Nylon 6 |
|---|---|---|---|---|---|---|---|---|---|
| Extruder Temp (° C.) | Zone 1 (Feed) | 160 | 130 | 175 | 170 | 240 | 140 | 130 | 230 |
|  | Zone 2 | 180 | 140 | 195 | 195 | 250 | 160 | 140 | 230 |
|  | Zone 3 | 200 | 150 | 215 | 215 | 265 | 180 | 150 | 240 |
|  | Zone 4 | 200 | 170 | 215 | 215 | 270 | 180 | 170 | 240 |
|  | Zone 5 | 200 | 180 | 225 | 215 | 270 | 180 | 180 | 250 |
|  | Zone 6 | 210 | 200 | 235 | 225 | 270 | 190 | 200 | 250 |
|  | Zone 7 | 225 | 200 | 250 | 235 | 280 | 200 | 200 | 260 |
|  | Zone 8 (Die) | 230 | 205 | 260 | 250 | 280 | 210 | 205 | 265 |
| Melt Injection Unit Temp(° C.) | Zone 9 Zone 10 Zone 11 Zone 12 | All zones set to 100° C. when using S-2005 | | | | | | | |
| Drive | rpm | 450 | 450 | 450 | 450 | 450 | 450 | 450 | 450 |
| Feed | Max kg/hr | 6 | 6 | 3 | 6 | 6 | 5 | 5 | 6 |

In this exemplary extrusion protocol, the fluoropolymer additive is introduced at Zone 1, and extrusion occurs at Zone 12. These conditions are suitable for a Liestritz 18 mm co-rotating twin screw extruder.

Embodiments of the method in which one or more fluoropolymer components are not melted have the advantage of preventing the emission of hydrogen fluoride from the fluoropolymers, as sometimes occurs upon melting. Thus in such embodiments the extruder need not have hydrogen fluoride resistant superalloy surfaces, and may have surfaces made of less specialized materials such as steel. This has the advantage of decreasing production costs and increasing environmental health and safety during the process.

D. EXTRUDED WORKPIECE

An extruded workpiece is provided. In a first general embodiment, the extruded workpiece comprises any of the blends provided above. In a second general embodiment, the extruded workpiece is the product of any of the processes of manufacturing an extruded polymer workpiece provided above, The workpiece may be any thermoplastic workpiece known in the art. Specific examples of suitable extruded workpieces include a bag, a film, a container, a filament, a food package, and a coating (such as a coating or jacketing for a wire). Further examples of suitable food packages include a bottle and a food pouch. Bottles that contain viscous fluids (such as sweet sauces) commonly have retention problems that would benefit from providing a lower energy internal surface. Food pouches are difficult to empty, and also would benefit from providing a lower energy internal surface.

The workpieces of this disclosure display very low surface energies, resulting in several desirable characteristics. Some embodiments of the workpiece are remarkably impermeable. Such impermeability has been observed for example to oils. A specific embodiment of the workpiece shows less than about 0.5% weight loss of a vegetable oil when tested according to DOT Appendix B part 173. Embodiments of the workpiece have also been observed to have very low leaching characteristics. For example, some embodiments of the workpiece have a total extractable metals less than about 4.0 ppb w/w when extracted in 5% w/w aqueous hydrofluoric acid solution for 48 hours, Low adhesion has also been observed. Some embodiments of the workpiece do not significantly adhere to adhesive (such as an acrylic or rubber based adhesive) after being in contact with the adhesive for 48 h at 100° F. (38° C). Further embodiments do not stick to food products; for example, some embodiments of the workpiece retain less than about 5% wet cat food according to Cat Food Retention Test of Example 4 provided below (alternatively, the workpiece may retain less than about 5% wet cat food when tested according to the Sauce Retention Test of Example 8 below). The low surface energy can also provide very low surface friction to the workpiece. For example, some embodiments of the workpiece exert no more than about 2 mPa of stress according to Extruding Fixture Friction Test of Example 5 provided below. Some embodiments of the workpiece also resist adhesion to soil, such that the workpiece resists soil according to AATCC Test Method 122-2013, Appendix A. The low surface energy is also useful in food containers and bottles that contain viscous sauces and other foods; for example, some embodiments of the workpiece retain less than about 15% jelly according to the Sauce Retention Test of Example 8 provided below. Further embodiments of the workpiece retain less than about 3% of a sauce according to the Sauce Retention Test of Example 8, said sauce selected from the group consisting of: ketchup, mustard, mayonnaise, and marinara sauce. Specific embodiments of such food containers are a blend of at least 95 parts w/w HDPE and 5 parts w/w fluoropolymer fraction, and wherein the combined HDPE and fluoropolymer fraction are at least 80 w/w of the blend.

Another class of workpieces that benefits from reduced surface energy are coatings for wire insulation. The manufacturing of the wire exerts friction on the insulation coating, and a significant reduction in surface energy of the insulation coating creates a resultant reduction in friction. Specific embodiments of such insulation coatings comprise about 99% PA-6 and about 1% of any fluoropolymer fraction described above.

Yet another class of workpieces that benefits from reduced surface energy are molds for hydraulic hose manufacturing. The manufacturing of the hose exerts friction on the mold, and a significant reduction in surface energy of the mold creates a resultant reduction in friction. Specific embodiments of such molds comprise about 99% PA-6 and about 1% of any fluoropolymer fraction described above, The reduction in surface energy may be measured by the aqueous contact angle of the surface. Embodiments of the workpiece have aqueous contact angles of at least about 80°. Further embodiments have aqueous contact angles of at least about 83°, 85°, 90°, and 94°. Contact angle can be measured by any standard method known in the art, including the method provided below in Example 10.

E. ELECTRIC WIRE, METHOD FOR PRODUCING ELECTRIC WIRE, AND MASTERBATCH

The present disclosure also relates to an electric wire including a core wire and a coating layer covering the core wire. The coating layer contains a fluorine-free resin and a fluorine-containing crystalline polymer. The fluorine-free resin includes at least one selected from the group consisting of polyamide resins, polyolefin resins, and polyvinyl chloride resin. The fluorine-containing crystalline polymer represents 0.5 to 4.0 mass % relative to the fluorine-free resin, The electric wire of the present disclosure has good surface smoothness, and thus has excellent workability of insertion into (or of removal from) an article such as a pipe.

The electric wire of the present disclosure has a smooth surface, and thus has excellent appearance.

The electric wire of the present disclosure is less likely to suffer bleeding of components from the coating layer, and thus has excellent storage stability. Such reduced bleeding of components can reduce problems such as impairment of tactile sensations of the coating layer (stickiness on the surface) and sticking of such components to electric-wire-forming devices. In contrast, conventional additives such as fatty acid amides and silicone oil usually bleed out after formation of electric wires, and thus may impair tactile sensations of coating layers and may stick to electric-wire-forming devices.

The coating layer contains a fluorine-free resin, and the fluorine-free resin includes at least one selected from the group consisting of polyamide resins, polyolefin resins, and polyvinyl chloride resin.

The polyamide resins, the polyolefin resins, and the polyvinyl chloride resin may be known ones usable as coating materials for electric wires.

The polyamide resins preferably include at least one selected from the group consisting of Polyamide 6, Polyamide 66, and Polyamide 12. Polyamide 6 is particularly preferred.

The polyolefin resins preferably include at least one selected from the group consisting of polyethylene and polypropylene. Examples of the polyethylene include high-density polyethylene (HOPE), medium-density polyethylene (MDPE), low-density polyethylene (LDPE), linear low-density polyethylene (L-LDPE), and very low-density polyethylene (V-LDPE), Preferred among these are low-density polyethylene (LDPE), linear low-density polyethylene (L-LDPE), and very low-density polyethylene (V-LDPE).

The fluorine-free resin is preferably a polyamide resin.

The coating layer contains a fluorine-containing crystalline polymer. Examples of the fluorine-containing crystalline polymer include polytetrafluoroethylene (PTFE), tetrafluoroethylene (TFE)/perfluoro(alkyl vinyl ether) (PAVE) copolymers (PFA), TFE/hexafluoropropylene (HFP) copolymers (FEP), ethylene (Et)/TFE copolymers (ETFE), Et/TFE/HFP copolymers (EFEP), and polyvinylidene fluoride (PVdF).

The fluorine-containing crystalline polymer preferably has a melting point of 100° C. to 360° C., more preferably 140° C. to 350° C., still more preferably 160° C. to 320° C., particularly preferably 180° C. to 300° C.

The term "melting point" herein means the temperature corresponding to the maximum value on a heat-of-fusion curve with a temperature-increasing rate of 10° C./min using a differential scanning calorimeter (DSC).

When the fluorine-free resin is a polyamide resin, the melting point of the fluorine-containing crystalline polymer preferably ranges from the temperature 20° C. lower than the melting point of the polyamide resin to the temperature 80° C. higher than the melting point of the polyamide resin, more preferably from the temperature 10° C. lower than the melting point of the polyamide resin to the temperature 50° C. higher than the melting point of the polyamide resin.

When the fluorine-free resin is a polyolefin resin, the melting point of the fluorine-containing crystalline polymer preferably ranges from the temperature 40° C. higher than the melting point of the polyolefin resin to the temperature 160° C. higher than the melting point of the polyolefin resin, more preferably from the temperature 80° C. higher than the melting point of the polyolefin resin to the temperature 160° C. higher than the melting point of the polyolefin resin.

When the fluorine-free resin is polyvinyl chloride resin, the melting point of the fluorine-containing crystalline polymer preferably ranges from 150° C. to 300° C., more preferably from 190° C. to 270° C.

The fluorine-containing crystalline polymer is preferably a melt-fabricable, fluorine-containing crystalline polymer. The term "melt-fabricable" herein means that a polymer can be processed in a molten state using a conventional processing device such as an extruder or an injection molding device.

The melt-fabricable, fluorine-containing crystalline polymer preferably has a melt flow rate (MFR) of 0.1 to 100 g/10 min, more preferably 0.5 to 50 g/10 min.

The MFR herein means the mass (g/10 min) of a polymer flowing out of a nozzle (inner diameter: 2 mm, length: 8 mm) for each 10 minutes at a measurement temperature predetermined in accordance with the type of the fluoropolymer (e.g., 372° C. for PFA and FEP, 297° C. for FIFE, 380° C. for PTFE) and a load predetermined in accordance with the type of the fluoropolymer (e.g., 5 kg for PFA, FEP, ETFE, and PTFE) using a melt indexer in accordance with ASTM D1238.

Examples of the melt-fabricable, fluorine-containing crystalline polymer include the aforementioned PFA, FEP, ETFE, EFEP, and PVdF.

The fluorine-containing crystalline polymer is preferably at least one selected from the group consisting of FEP, ETFE, EFEP, and PVdF, more preferably at least one selected from the group consisting of FEP, ETFE, and EFEP, still more preferably at least one selected from the group consisting of FEP and ETFE, and is most preferably FEP.

The FEP may be any one, and is preferably a copolymer containing a TFE unit and a HFP unit at a TFE/HFP mole ratio of not lower than 70/30 but lower than 99/1. The mole ratio is more preferably not lower than 75/25 and not higher than 98/2, still more preferably not lower than 80/20 and not higher than 95/5. Too small an amount of the TFE unit tends to cause impaired smoothness, while too large an amount thereof tends to cause so high a melting point, possibly resulting in impaired appearance. The FEP is also preferably a copolymer containing 0.1 to 10 mol % of a monomer unit derived from a monomer copolymerizable with TFE and HFP and 90 to 99.9 mol % in total of the TFE unit and the HFP unit. Examples of the monomer copolymerizable with TFE and HFP include PAVE and alkyl perfluorovinyl ether derivatives.

The FEP preferably has a melting point of not lower than 150° C. but lower than 324° C., more preferably 200° C. to 320° C., still more preferably 210° C. to 280° C.

The FEP preferably has a MFR of 0.1 to 100 g/10 min, more preferably 0.5 to 50 g/10 min.

The ETFE is preferably a copolymer containing a TFE unit and an ethylene unit at a TFE/ethylene mole ratio of not lower than 20/80 and not higher than 90/10. The mole ratio is more preferably not lower than 37/63 and not higher than 85/15, still more preferably not lower than 38/62 and not higher than 80/20. The ETFE may be a copolymer containing TFE, ethylene, and a monomer copolymerizable with TFE and ethylene. Examples of the copolymerizable monomer include monomers represented by any of $CH_2=CX^5Rf^3$, $CF_2=CFRf^3$, $CF_2=CFORf^3$, and $CH_2=C(Rf^3)_2$ (where $X^5$ is a hydrogen atom or a fluorine atom; and $Rf^3$ is a fluoroalkyl group which may optionally contain an ether bond). Preferred among these are fluorine-containing vinyl monomers represented by any of $CF_2=CFRf^3$, $CF_2=CFORf^3$, and $CH_2=CX^5Rf^3$. More preferred are HFP, perfluoro(alkyl vinyl ether) represented by $CF_2=CF-ORf^4$ (where $Rf^4$ is a C1-C5 perfluoroalkyl group), and fluorine-containing vinyl monomers represented by $CH_2=CX^5Rf^3$ (where $Rf^3$ is a C1-C8 fluoroalkyl group). The monomer copolymerizable with TFE and ethylene may also be an unsaturated aliphatic carboxylic acid such as itaconic acid or itaconic anhydride. The amount of the monomer copolymerizable with TFE and ethylene is preferably 0.1 to 10 mol %, more preferably 0.1 to 5 mol %, particularly preferably 0.2 to 4 mol %, relative to the fluorine-containing polymer.

The ETFE preferably has a melting point of not lower than 150° C. but lower than 324° C., more preferably 200° C. to 320° C., still more preferably 210° C. to 280° C.

The ETFE preferably has a MFR of 0.1 to 100 g/10 min, more preferably 0.5 to 50 g/10 min.

The amount of each monomer unit in the aforementioned copolymers can be calculated by any appropriate combination of NMR, FT-IR, elemental analysis, and X-ray fluorescence analysis in accordance with the type of the monomer.

The amount of the fluorine-containing crystalline polymer is 0.5 to 4.0 mass % relative to the fluorine-free resin. In order to give much better smoothness, appearance, and storage stability to the electric wire, the amount thereof is preferably 0.5 to 3.0 mass %, more preferably 0.5 to 2.5 mass %, still more preferably 0.5 to 2.0 mass %, particularly preferably 0.5 to 1.5 mass %, relative to the fluorine-free resin.

In order to have much better appearance, the coating layer preferably has a surface roughness (Ra) of 5.0 µm or smaller, more preferably 3.0 µm or smaller, still more preferably 2.0 µm or smaller. The lower limit of the surface roughness may be 0.1 µm.

The surface roughness is a value determined by observing the surface of the coating layer using a laser microscope at 110× magnification.

When the fluorine-free resin is a polyamide resin, the coating layer preferably has a coefficient of static friction on the surface of 0.32 or lower, more preferably 0.29 or lower, still more preferably 0.28 or lower. The lower limit of the coefficient of static friction is preferably as low as possible, and may be 0.01.

When the fluorine-free resin is a polyolefin resin, the coating layer preferably has a coefficient of static friction on the surface of 0.22 or lower, more preferably 0.20 or lower, still more preferably 0.19 or lower. The lower limit of the coefficient of static friction is preferably as low as possible, and may be 0.01.

When the fluorine-free resin is polyvinyl chloride resin, the coating layer preferably has a coefficient of static friction on the surface of 0.36 or lower, more preferably 0.34 or lower, still more preferably 0.32 or lower. The lower limit of the coefficient of static friction is preferably as low as possible, and may be 0.01.

The coating layer having a coefficient of friction within the above range can have much better smoothness, The coefficient of static friction is a value determined using a surface property tester and a stainless steel plate (1 cm²) serving as a friction element in accordance with ASTM D1894.

The coating layer may have any thickness, and the thickness is preferably 50 µm or greater.

The coating layer may further contain an additional component as appropriate. Examples of the additional component include additives such as crosslinkers, crosslinking aids, antistatics, heat-resistance stabilizers, foaming agents, foam nucleating agents, antioxidants, surfactants, photopolymerization initiators, abrasion inhibitors, surface modifiers, lubricants, processing aids, ultraviolet stabilizers, flame retardants, plasticizers, filler, photostabilizers, reinforcing agents, impact-resistance improvers, and pigments.

The core wire may be formed of any material having good conductivity. Examples of the material include copper, copper alloys, copper-clad aluminum, aluminum, silver, gold, and zinc-plated iron. The core wire may be a single wire or may be a stranded wire formed by twisting a plurality of single wires.

The core wire may have any shape, such as either round or flat. In the case of a round conductor, the diameter of the core wire may not be particularly limited, and is suitably AWG54 or thicker.

The electric wire of the present disclosure may further include an additional layer, such as an additional resin layer, between the core wire and the coating layer. Further, in order to significantly achieve the aforementioned effects of the electric wire, the coating layer is preferably not covered with an additional layer, in other words, the coating layer is preferably the outermost layer.

The coating layer of the electric wire of the present disclosure may constitute an insulation layer or may constitute a sheath layer.

The electric wire of the present disclosure is suitable for use as a power cable, especially a low voltage power cable. The term "low voltage" herein means 1000 V or lower, preferably 10 to 600 V.

The present disclosure also relates to a method for producing an electric wire. The method includes the steps of: (1) mixing a masterbatch containing a fluorine-free and a fluorine-containing crystalline polymer with a fluorine-free resin to provide a coating composition; and (2) melt-extruding the coating composition onto a core wire to form a coating layer on the core wire. The fluorine-free resin includes at least one selected from the group consisting of polyamide resins, polyolefin resins, and polyvinyl chloride resin. The fluorine-containing crystalline polymer in the masterbatch represents 5.0 to 50.0 mass % relative to the fluorine-free resin in the masterbatch. The fluorine-containing crystalline polymer in the coating layer represents 0.5 to 4.0 mass % relative to the fluorine-free resin in the coating layer.

The above production method can favorably provide the aforementioned electric wire of the present disclosure.

The masterbatch used in the step (1) contains a fluorine-free resin and a fluorine-containing crystalline polymer. The fluorine-free resin and the fluorine-containing crystalline polymer may be the same as any of those mentioned respectively as the fluorine-free resin and the fluorine-containing crystalline polymer in the description of the electric wire of the present disclosure, and preferred examples thereof are also the same as those mentioned in the description of the electric wire of the present disclosure.

The amount of the fluorine-containing crystalline polymerin the masterbatch is 5.0 to 50.0 mass %, preferably 8.0 to 40.0 mass %, more preferably 10.0 to 20.0 mass %, relative to the fluorine-free resin in the masterbatch, The fluorine-containing crystalline polymer used for the masterbatch is preferably in the form of powder having an average particle size of 0.1 to 500.0 µm. This can lead to an electric wire having much better smoothness, appearance, and storage stability. The average particle size is more preferably 1.0 to 50.0 µm, still more preferably 3.0 to 10.0 µm.

The average particle size is the value corresponding to 50% of the cumulative particle size distribution obtained using a laser diffraction particle size analyzer.

The masterbatch may contain an additional component as appropriate. Examples of the additional component include the same as those mentioned as additional components that may be contained in the coating layer of the electric wire of the present disclosure.

The masterbatch may be produced by mixing the fluorine-free resin and the fluorine-containing crystalline polymer optionally together with an additional component as appropriate. This mixing may be performed using a device such as a single- or twin-screw extruder, an open roll mill, a kneader, or a Banbury mixer.

The masterbatch may be in any form such as powder, granules, or pellets, and is preferably in the form of pellets obtained by melt kneading because the fluorine-containing crystalline polymer can remain dispersed finely in the fluorine-free resin.

The temperature for the melt kneading is preferably higher than the melting point of the fluorine-free resin, more preferably 5° C. or more higher than the melting point of the fluorine-free resin.

In the step (1), the masterbatch and the fluorine-free resin are mixed to provide a coating composition. The fluorine-free resin mixed with the masterbatch is preferably a fluorine-free resin of the same type as the fluorine-free resin contained in the masterbatch. The masterbatch and the fluorine-free resin are mixed at a ratio such that the amount of the fluorine-containing crystalline polymer in the coating layer of the resulting electric wire is 0.5 to 4.0 mass % relative to the fluorine-free resin of the coating layer.

The mixing of the masterbatch and the fluorine-free resin may be performed by a known method. An additional component may be mixed therewith as appropriate. Examples of the additional component include the same as those mentioned as additional components that may be contained in the coating layer of the electric wire of the present disclosure.

In the step (2), the coating composition is melt-extruded onto a core wire, so that a coating layer is formed on the core wire. Examples of the core wire include the same as those usable for the electric wire of the present disclosure.

The melt extrusion may be performed using a known extruder such as a single- or twin-screw extruder. The temperature for the melt extrusion is preferably not lower than the melting point of the fluorine-free resin and not higher than 320° C., more preferably not higher than 300° C.

Figure 10:
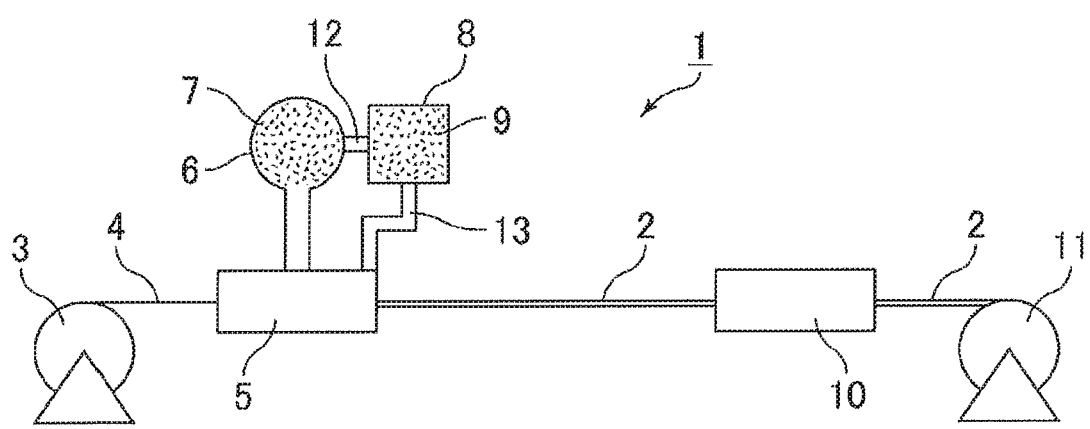
FIG. 10. An example of a device usable in the method for producing an electric wire of the present disclosure.

FIG. 10 shows an example of a device usable in the method for producing an electric wire of the present disclosure. A device 1 for producing an electric wire 2 includes a reel 3 configured to supply a core wire 4 to an extrusion head 5, a tank 6 for a fluorine-free resin 7, a tank 8 for a masterbatch 9 to be mixed with the fluorine-free resin 7, a cooling box 10 configured to cool the outer surface of a mixture of the fluorine-free resin 7 and the masterbatch 9 (coating composition) in a molten or semi-solid state on the core wire 4, and a reel 11 configured to take up the resulting electric wire 2.

Further, as shown in FIG. 10, the tank 8 is provided with a section 12 through which the masterbatch 9 is allowed to pass into the tank 6 for mixing with the fluorine-free resin 7 and a section 13 configured to introduce the masterbatch 9 directly into the extrusion head 5 after the fluorine-free resin 7 is introduced into the extrusion head 5.

The present disclosure also relates to a masterbatch for forming a coating layer on a core wire of an electric wire. The masterbatch contains a fluorine-free resin and a fluorine-containing crystalline polymer. The fluorine-free resin includes at least one selected from the group consisting of polyamide resins, polyolefin resins, and polyvinyl chloride resin. The fluorine-containing crystalline polymer represents 5.0 to 50.0 mass % relative to the fluorine-free resin.

The fluorine-free resin and the fluorine-containing crystalline polymer contained in the masterbatch of the present disclosure may be the same as any of those mentioned respectively as the fluorine-free resin and the fluorine-containing crystalline polymer in the description of the electric wire of the present disclosure (or the masterbatch used in the method for producing an electric wire of the present disclosure), and preferred examples thereof are also the same as those mentioned in the description of the electric wire of the present disclosure.

The amount of the fluorine-containing crystalline polymer in the masterbatch is 5.0 to 50.0 mass %, preferably 8.0 to 40.0 mass %, more preferably 10.0 to 20.0 mass %, relative to the fluorine-free resin in the masterbatch.

The fluorine-containing crystalline polymer used for the masterbatch is preferably in the form of powder having an average particle size of 0.1 to 500.0 µm. This can lead to an electric wire having much better smoothness, appearance, and storage stability. The average particle size is more preferably 1.0 to 50.0 µm, still more preferably 3.0 to 10.0 µm.

The average particle size is the value corresponding to 50% of the cumulative particle size distribution obtained using a laser diffraction particle size analyzer.

The masterbatch may contain an additional component as appropriate. Examples of the additional component include the same as those mentioned as additional components that may be contained in the coating layer of the electric wire of the present disclosure.

The masterbatch may be produced by mixing the fluorine-free resin and the fluorine-containing crystalline polymer optionally together with an additional component as appropriate. This mixing may be performed using a device such as a single- or twin-screw extruder, an open roll mill, a kneader, or a Banbury mixer.

The masterbatch may be in any form such as powder, granules, or pellets, and is preferably in the form of pellets obtained by melt kneading because the fluorine-containing crystalline polymer can remain dispersed finely in the fluorine-free resin.

The temperature for the melt kneading is preferably higher than the melting point of the fluorine-free resin, and is more preferably 5°0. C. or more higher than the melting point of the fluorine-free resin.

The masterbatch of the present disclosure is suitable for use in production of the aforementioned electric wire of the present disclosure. For example, the masterbatch of the present disclosure is suitable for use as the masterbatch in the step (1) of the aforementioned method for producing an electric wire of the present disclosure.

F. EXAMPLES

Example 1

Thermoplastic resin (HDPE) and a fluoropolymer additive (0.1 to 2.0% w/w) were mixed and heated so as to form a melt. The fluoropolymer additive included one or both of a copolymer ("FA/StA") of an acrylic fluoropolymer ("FA") and stearyl acrylate ("StA"), and a fluorine-containing polymer (e.g., FEP, EFEP, and PTFE). For fluoropolymer additives containing both the FA/StA copolymer and a fluorine-containing polymer, the ratio of FA/StA copolymer to fluorine-containing polymer ranged from 1:1 to 6:1 (w/w). The thermoplastic mixture was extruded to produce a rigid container. The containers were tested using the "Procedure for Testing Chemical Compatibility and Rate of Permeation in Plastic Packaging and Receptacles" as described in 49 CFR Part 173, Appendix B to Part 173 (current version as of June 2016). As shown in FIG. 1, the permeability of containers extruded from a blend of HDPE and varying concentrations of mixed FA/StA and FEP (4:1 w/w) was tested, demonstrating increased impermeability with increased FA/StA and FEP concentration.

Briefly, the containers were filled with solutions of insecticides (e.g., bifenthrin, ζ-cypermethrin), heated at 50° C. for 28 days, and the change in concentration of the insecticide was measured.

TABLE 1

|  | Change in concentration (%) relative to initial | |
| --- | --- | --- |
|  | Bifenthrin | ζ-cypermethrin |
| HDPE Control | 86 | 89 |
| 1% EFEP | 90 | 98 |
| 0.1% (FA/StA)/0.1% EFEP | 92 | 90 |
| 0.1% (FA/StA)/0.4% EFEP | 90 | >100 |
| 0.4% (FA/StA)/0.1% EFEP | 89 | >100 |
| 0.4% (FA/StA)/0.4% EFEP | 90 | 88 |
| 0.6% (FA/StA)/0.1% FEP | 92 | >100 |
| 0.8% (FA/StA)/0.2% FEP | 93 | >100 |

Table 1. >100 implies no change to composition

Example 2

Thermoplastic resin (HL HDPE) and a fluoropolymer additive (0.1 to 1.1% w/w) were mixed and heated to form a melt. The fluoropolymer additive was the FA/StA copolymer (FA/STA) and FEP in a 4:1 (w/w) ratio. The melt was extruded to produce a molded item (e.g., bottle). To test the chemical resistance of the molded item, a weighed aqueous HF solution (5%) was placed in contact with the extruded item. For molded containers, the HF solution was placed inside of the molded container and allowed to sit at room temperature for 48 h. Extracted metals ("trace elements") were measured by atomic adsorption ("AA"), inductively coupled plasma ("ICP"), or some other technique. This test is referred to in this disclosure as "The Extracted Metal Test of Example 2." Table 2 summarizes the results for the control (HL HOPE) and three containers. The smaller values for the total metal extractables corresponds to improved chemical resistance (permeation resistance).

TABLE 2

| Trace Elements, ppb | | HL HDPE Contol | 0.1% FA/STA/ FEP | 0.53% FA/STA/ FEP | 1.1% FA/STA/ FEP |
| --- | --- | --- | --- | --- | --- |
| Lithium | Li | 0 | 0 | 0 | 0 |
| Beryllium | Be | 0 | 0 | 0 | 0 |
| Boron | B | 0 | 0 | 0 | 0 |
| Magnesium | Mg | 0.9 | 0 | 0 | 0.05 |
| Aluminum | Al | 0.9 | 0.07 | 0.12 | 0.1 |
| Thallium | Ti | 0.16 | 0 | 0 | 0.14 |
| Vanadium | V | 0 | 0 | 0 | 0 |
| Chromium | Cr | 0.06 | 0 | 0 | 0 |
| Manganese | Mn | 0 | 0 | 0 | 0 |
| Nickel | Ni | 0 | 0 | 0 | 0 |
| Cobalt | Co | 0.06 | 0.06 | 0.05 | 0.07 |
| Copper | Cu | 0.24 | 0.12 | 0 | 0 |
| Zinc | Zn | 0.08 | 0 | 0.16 | 0 |
| Gallium | Ga | 0 | 0 | 0 | 0 |
| Germanium | Ge | 0 | 0 | 0 | 0 |
| Arsenic | As | 0 | 0 | 0 | 0 |
| Strontium | Sr | 0 | 0 | 0 | 0 |
| Zirconium | Zr | 0.04 | 0 | 0.03 | 0.04 |
| Niobium | Nb | 0 | 0 | 0 | 0 |
| Molybdenum | Mo | 0 | 0 | 0 | 0 |
| Silver | Ag | 0 | 0 | 0 | 0 |
| Cadmium | Cd | 0 | 0 | 0 | 0 |
| Tin | Sn | 0 | 0 | 0 | 0 |
| Antimony | Sb | 0 | 0 | 0 | 0 |
| Barium | Ba | 0 | 0 | 0 | 0 |
| Tantalum | Ta | 0 | 0 | 0 | 0 |
| Tungsten | W | 0 | 0 | 0 | 0 |
| Gold | Au | 0 | 0 | 0 | 0 |
| Thallium | Ti | 0 | 0 | 0 | 0 |
| Lead | Pb | 0 | 0 | 0 | 0 |
| Bismuth | Bi | 0 | 0 | 0 | 0 |
| Thorium | Th | 0 | 0 | 0 | 0 |
| Uranium | U | 0 | 0 | 0 | 0 |
| Iron | Fe | 1.3 | 0 | 0.5 | 0.79 |
| Sodium | Na | 0.15 | 0 | 0 | 0 |
| Calcium | Ca | 0.23 | 0.22 | 0.15 | 0.2 |
| Potassium | K | 0 | 0 | 0 | 0 |
| Total metal extractables = | | 4.12 | 0.47 | 1.01 | 1.39 |

Example 3

A mixture of thermoplastic resin (LLDPE), a fluoropolymer additive (1.0% to 3.4% w/w), and optionally pentaerythrityl tetrasterate ("PET") were heated to form a melt. The fluoropolymer additive included one or both of the FA/StA copolymer and another fluorine-containing polymer. For fluoropolymer additives containing both the FA/StA copolymer and another fluorine-containing polymer (EFEP, PTFE), the ratio of FA/StA copolymer to EFEP or PTFE was 6:1 (w/w). For those blends containing PET, the ratio of fluoropolymer additive PET was 10:3 (w/w). The thermoplastic blend was extruded to produce a film. The film was tested for reduced coefficient of friction and/or surface energy by applying the film to an acrylic or rubber based adhesive with a one-pound weight. The adhesives used were obtained directly from consumer products; specifically, the acrylic-based adhesive was obtained from ALWAYS ULTRA THIN menstrual pads (Procter & Gamble Co., Cincinnati, Ohio) and the rubber-based adhesive was obtained from 3M SERIES 2900 Duct Tape (available from 3M Company, Maplewood, Minn.). The film and adhesive were placed in an oven at 100° F. for a minimum of 48 h. The film and adhesive were removed from the oven and while still warm, the film was pulled from the adhesive; there should be no tearing of the adhesive in order to move on to the next testing step, After cooling the samples to room temperature (approximately 65 to 85° F.), a universal tester (i.e., Instron), was used to make a 180° F. pull at 50 mm/min for 100 mm. The blends tested included: (a) 1% EFEP/LLDPE; (b) 1% [6:1 (FA/StA) in EFEP]/LLDPE; (c) 3.4% (FA/StA)/LLDPE; and (d) 1.0% [10:3 (EFEP/PET)]/LLDPE. Of blends (a)-(d), blend (d) passed the "pull test" at 100° F. without tearing. The tensile force of blend (d) was measured with the universal tester (average force=1.61 N, standard deviation=0.28 N). The foregoing test is referred to in this disclosure as "the Tensile Strength Test of Example 3."

Example 4

Figure 2:
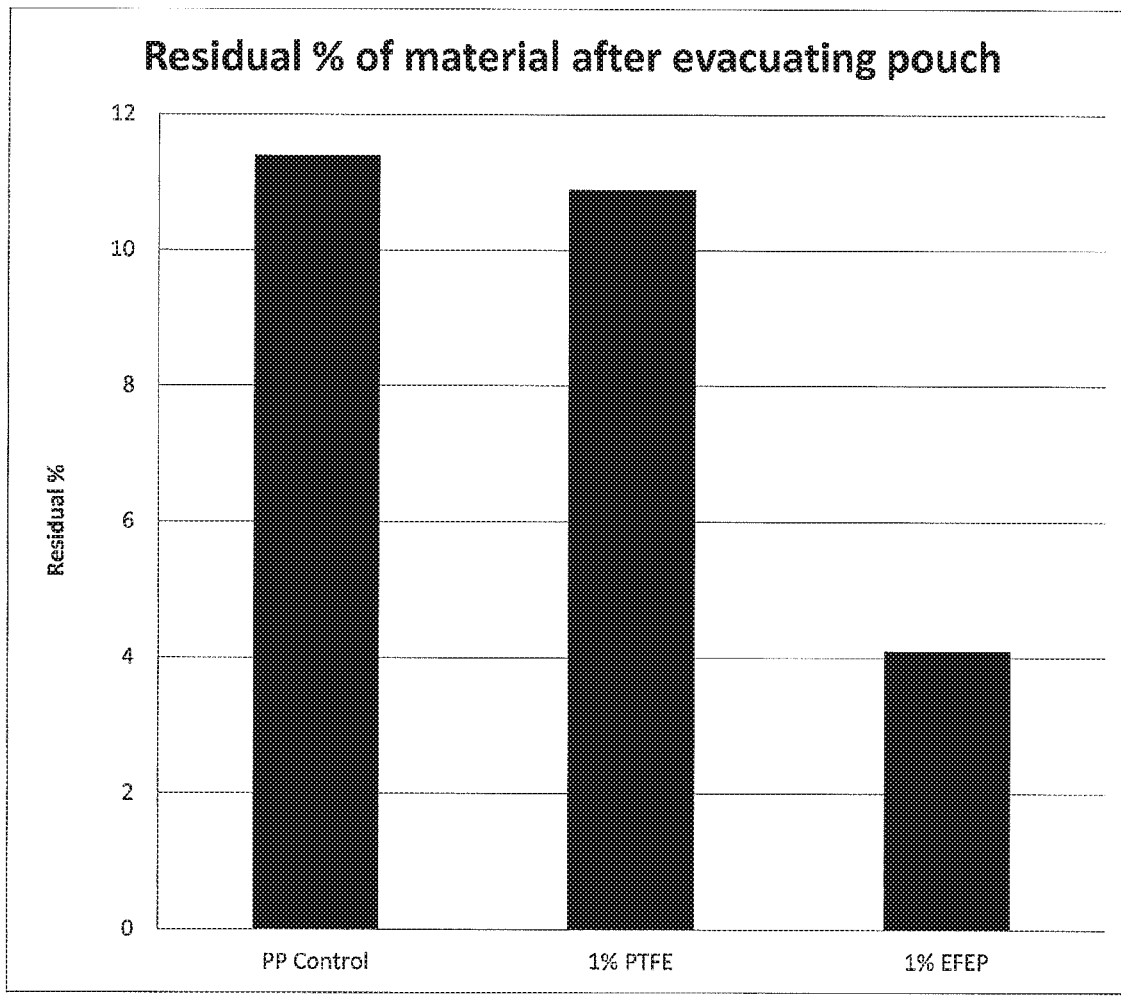
FIG. 2. Graph displays % residual cat food in pouches: PP control, 1% PFTE/PP, and 1% EFEP/PP.

Thermoplastic resin (PP) and a fluoropolymer additive (1.0% w/w of FEP, PTFE, or EFEP) were mixed with heating to form a melt and extruded into a film. The film was folded and heat-sealed to form an opened pouch. The pouch was filled with the pre-weighed wet cat food (FANCY FEAST available from Nestlé USA, Glendale, Calif.) and sealed. The filled pouch was allowed to sit at room temperature for 24h. The pouch was opened and evacuated and the amount of cat food was measured. The foregoing test is referred to in this disclosure as the "Cat Food Retention Test of Example 4." FIG. 2 shows the residual percentage of cat food after evacuating the pouch for a PP control, 1% PTFE/PP, and 1% FEP/PP. The 1% FEP/PP film resulted in a 2.8 fold improvement in the reduction of residue.

Example 5

Figure 3:
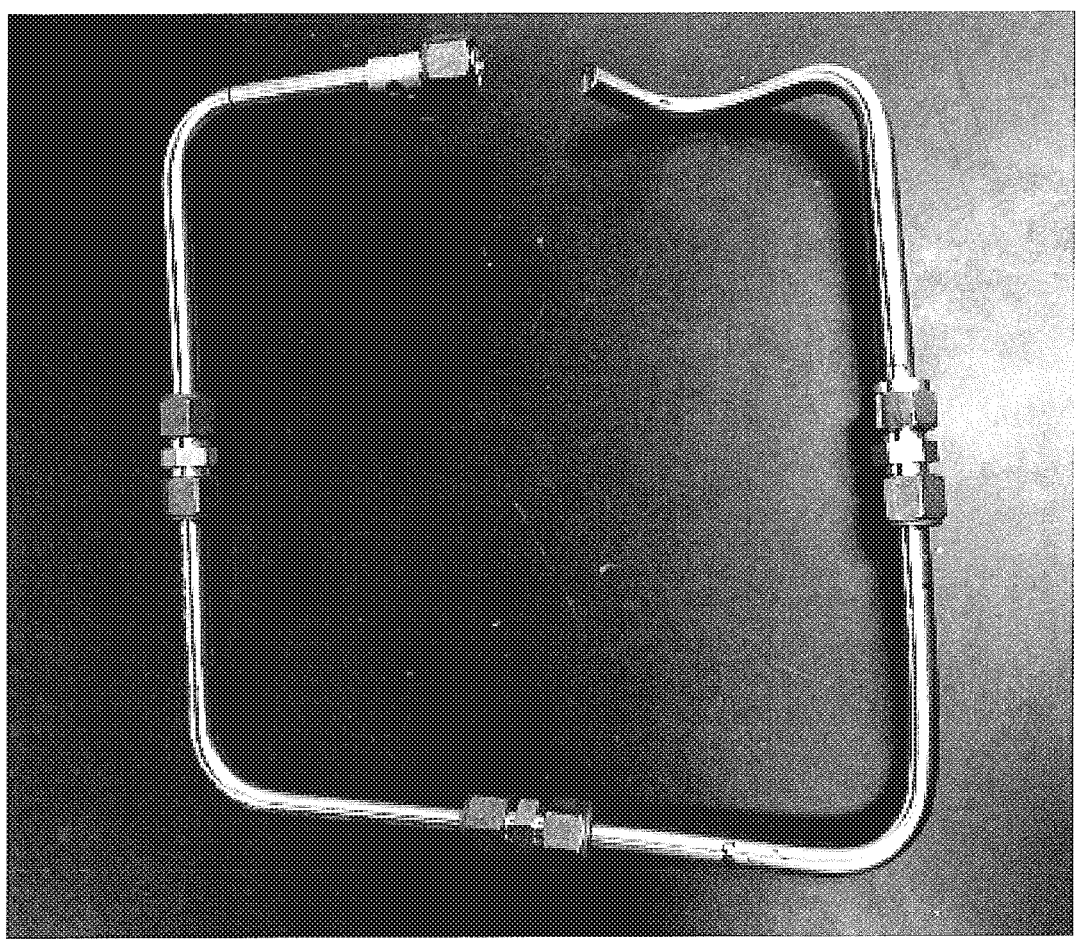
FIG. 3. Fixture used for extrusion: 36 in. long stainless steel tubing in. diameter), with 5×90° bends and at least 3 unions for assembly and disassembly.
Figure 4:
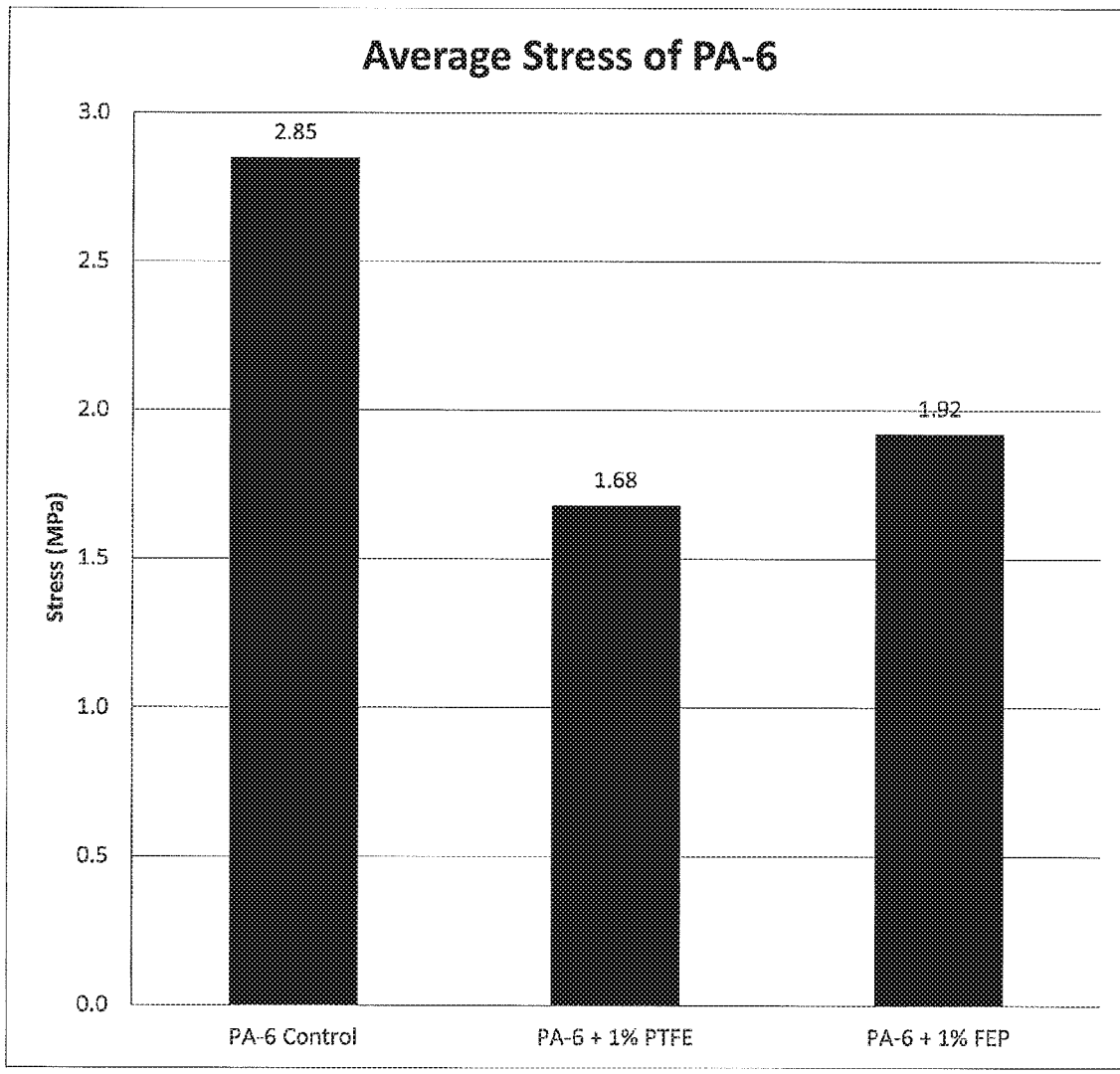
FIG. 4. Comparison of average stress of polyamide 6 (PA-6) and PA-6blends during extrusion: PA-6 (control), 1% PFTE/ PA-6, and 1% FEP/ PA-6.

Thermoplastic resin (PA-6) and a fluoropolymer additive (at either 0.5 or 1% w/w FEP or PTFE) were heated to form a melt and coextruded. The extruded material was cooled in a water bath after extrusion. A 36" fixture made of ⅜" stainless steel tubing, having five approximately 90° bends (see FIG. 3) was mounted in the universal tester (i.e. Instron 5582) and the strand was pulled at 400 mm/min for 650 mm. The stress was measured (MPa) that was necessary to pull the strand through the extruding fixture. After one measurement, the strand was pulled through the fixture four additional times for four additional stress measurements. The five measurements were averaged for each sample. The foregoing test is referred to in this disclosure as "Extruding Fixture Friction Test of Example 5," FIG. 4 shows the average stress required to pull the PA-6control, 1% PTFE/PA-6, and 1% FEP/PA-6 through the fixture. Both the 1% PTFE/PA-6 and the 1% FEP/PA-6 samples required less force to extrude through the fixture when compared to the PA-6 control. 1% PTFE/PA-6 resulted in a 1.7 fold reduction in stress.

EXAMPLE 6

Figure 5:
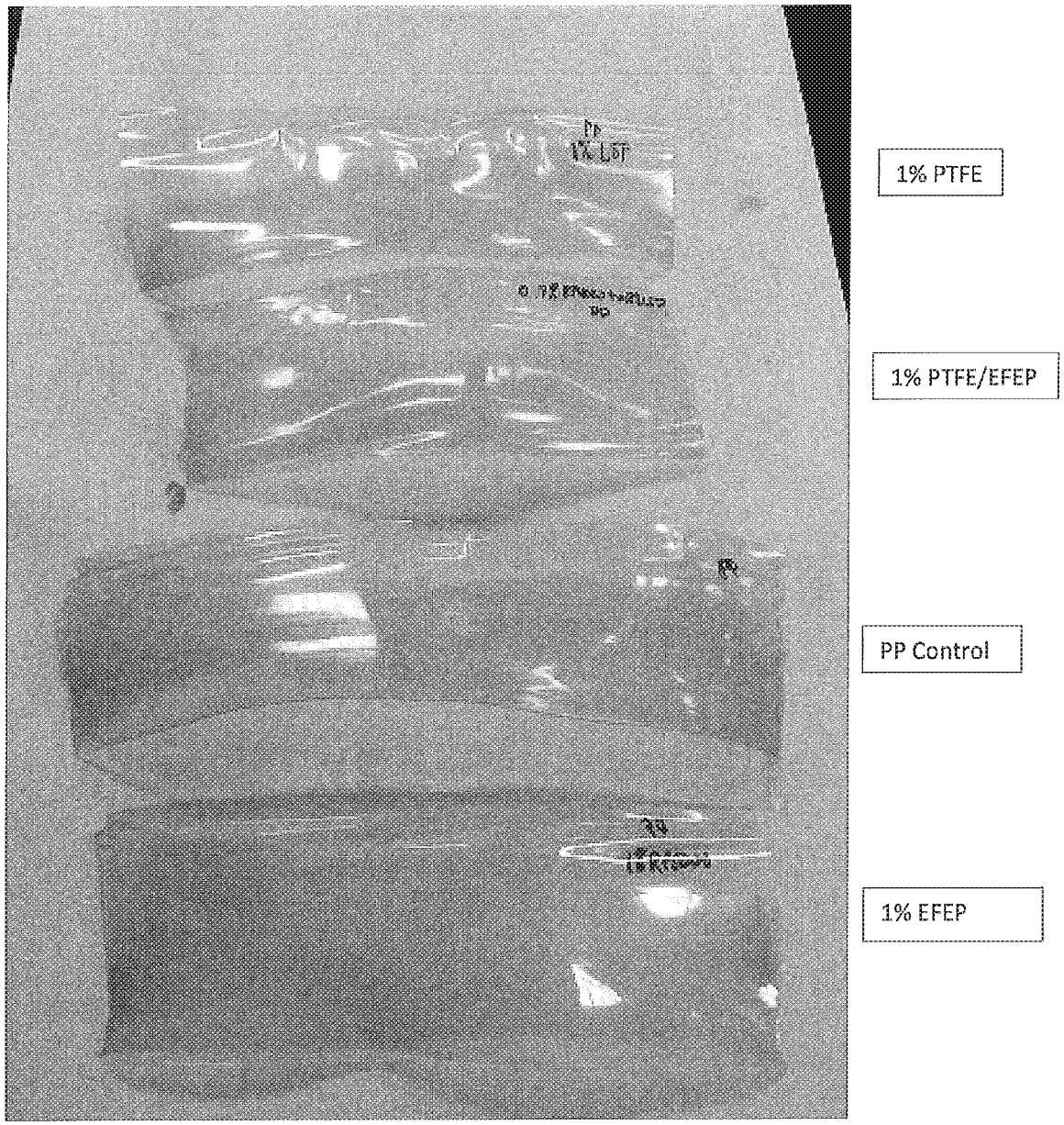
FIG. 5. Discoloration of films after heating bags containing spaghetti sauce in a 900 watt microwave for 3 minutes: PP control, 1% PFTE/PP, 1% (PTFE/EFEP)/PP, and 1% EFEP/PP.

Thermoplastic resin (PP), a fluoropolymer additive (0.1-1.5% (w/w) of the blend), and optionally PET were heated to form a melt and co-extruded to form a film. The film was immersed and heated in spaghetti sauce (Ragu Traditional brand spaghetti sauce) using a minimum 900 watt microwave oven for 3 minutes. The film was removed from the spaghetti sauce, washed with tap water, and wiped with a white paper towel until no residue was observed. The immersion of the film in fresh, unused spaghetti sauce, microwave heating, and rinsing of the film was repeated twice more. The discoloration of the film was observed. The foregoing test is referred to in this disclosure as "the Spaghetti Sauce Test of Example 6." Some reduction in staining was observed with 1% PTFE/PP film and 1.5% (EFEP: PTFE, 1:1, w/w)/PP as shown in FIG. 5.

Example 7

Figure 6:
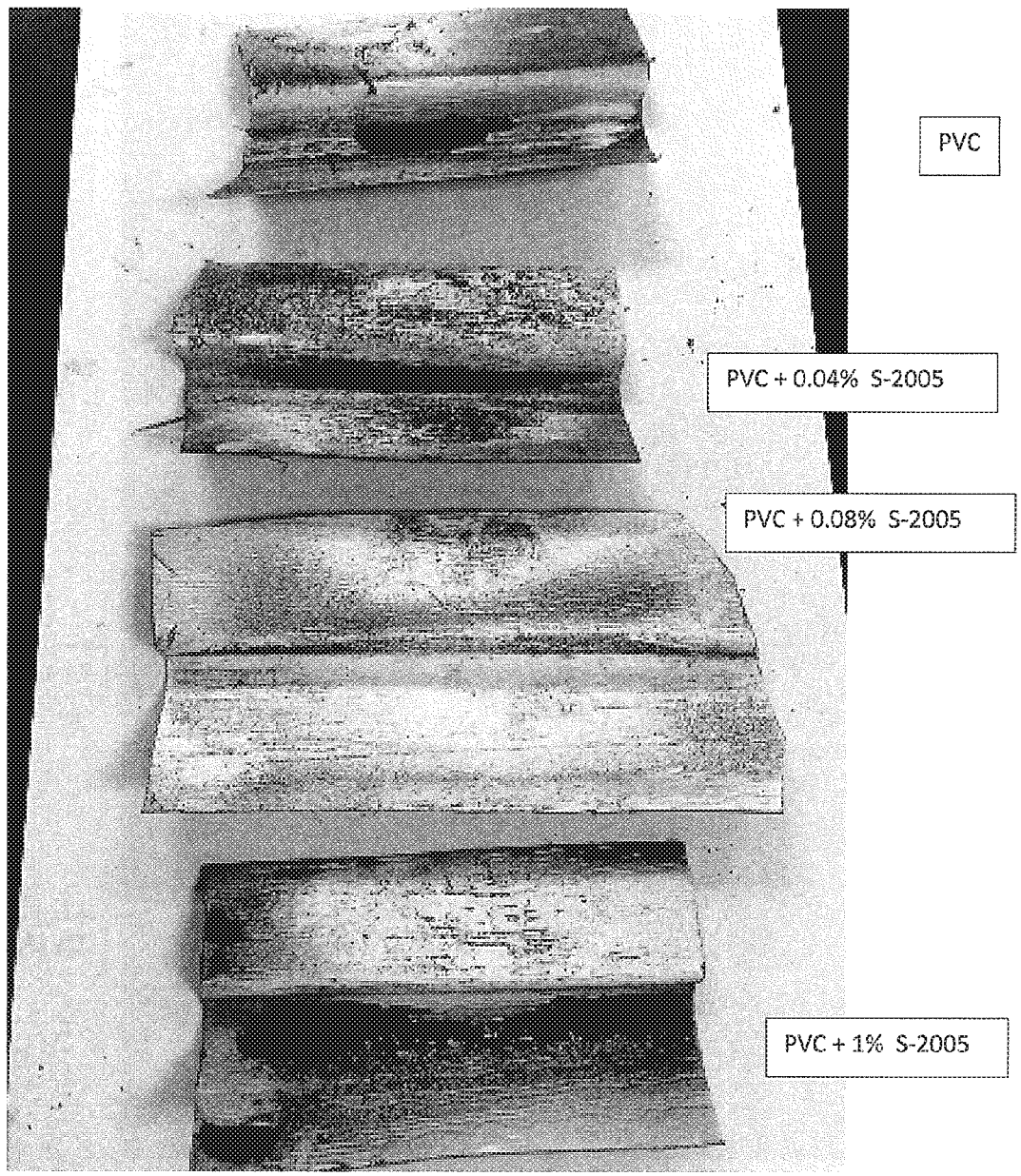
FIG. 6. Adherence of soil to samples: PVC control, 0.04% (FA/StA)/PVC, 0.08% (FA/StA)/PVC, and 1% (FA/StA)/PVC.

Thermoplastic resin (PVC) and a fluoropolymer additive (FA/StA copolymer, 0.01-1% of the blend) were heated to form a melt and co-extruded to form test samples. Soil (10 g), made according to American Association of Textile Colorist and Chemist (AATCC) test method 122-2013, Appendix A (2013) was added to each test sample in a 1 gallon container. The container was tumbled in a rotary tumbler for 1 h and the samples were removed from the soil. The staining of the test samples was observed. FIG. 6 shows three test samples and a control (PVC). Of the three test samples, 0.08% (FA/StA copolymer)/PVC showed the best improvement in the reduction of staining (soiling).

Example 8

Pouches A, B, and C (five of each) were prepared from LLDPE and the following additives: (a) EFEP (1% by weight) ("Pouch A"); (b) FA/STA/PTFE (1% by weight, 1:1 ratio, "Pouch B"); and (c) EFEP/PTFE (1% by weight, 1:1 ratio, "Pouch C"). Five control pouches were prepared from LLDPE alone; no additives were included in the control pouch composition. The pouches were formed by extrusion through a film die set to yield the smoothest film at approximately 2" in width. Five strips were cut to form pouches having a gusset of approximately 1 cm and he walls were heat-sealed, Each of the five pouches (of types A-C and control) were filled with jelly (Smucker's concord grape), ketchup (Heinz), mustard (Heinz), mayonnaise (Hellman's), and spaghetti sauce (Ragu Traditional), respectively, and the tops were heat-sealed. Approximately 24 hours after filling, each bag was weighed to determine the "filled weight". The top of each pouch was detached leaving the residual contents on the detached pieces in place. The pouches were then overturned to release respective contents and shaken for no longer than 15 seconds. At no point were the pouches squeezed to remove residual contents. The pouches were weighed to determine the weight of the pouches plus the residual content ("evacuated weight"). The pouches and detached pieces belonging to each pouch were rinsed with water to remove any residual content. The water was then removed from the pouches and detached pieces by blowing compressed air of no more than 30 psi and then air-drying. The dry, empty pouches were then weighed to determine the weight of the bag ("empty weight"). Thereafter, the content weight, residual weight, and residual percentages were calculated for each of the pouches/contents type. Residual percentage was based on remaining content divided by content weight. The foregoing test is referred to in this disclosure as "the Sauce Retention Test of Example 8."

TABLE 3

| | Sample | α Bag + Contents wt. | β Evacuated wt. | γ Clean/dry wt. | δ Contents wt. (α − γ) | ε Residue wt. (β − δ) | Residue % (ε/δ × 100) | Difference from Control wt | Improvement % |
|---|---|---|---|---|---|---|---|---|---|
| | | | | | All weights in grams | | | | |
| Control | Jelly | 42.87 | 9.58 | 1.33 | 41.54 | 8.25 | 19.86 | 0.0 | 0.0 |
| | Ketchup | 42.31 | 5.22 | 1.28 | 41.03 | 3.94 | 9.60 | 0.0 | 0.0 |
| | Mustard | 40.43 | 3.12 | 1.22 | 39.21 | 1.9 | 4.85 | 0.0 | 0.0 |
| | Mayonnaise | 40.91 | 3.13 | 1.32 | 39.59 | 1.81 | 4.57 | 0.0 | 0.0 |
| | Spagetti Sauce | 30.58 | 2.36 | 1.2 | 29.38 | 1.16 | 3.95 | 0.0 | 0.0 |
| 1% EFEP | Jelly | 44.28 | 4.15 | 1.06 | 43.22 | 3.09 | 7.15 | 5.2 | 62.5% |
| | Ketchup | 42.53 | 1.81 | 1 | 41.53 | 0.81 | 1.95 | 3.1 | 79.4% |
| | Mustard | 41.38 | 1.82 | 0.97 | 40.41 | 0.85 | 2.10 | 1.1 | 55.3% |
| | Mayonnaise | 46.29 | 2.08 | 1.02 | 45.27 | 1.06 | 2.34 | 0.8 | 46.4% |
| | Spagetti Sauce | 52.21 | 1.99 | 1.02 | 51.19 | 0.97 | 1.89 | 0.2 | 16.4% |
| 1% EFEP/PTFE 1:1 Ratio | Jelly | 44.83 | 7.49 | 1.15 | 43.68 | 6.34 | 14.51 | 1.9 | 23.2% |
| | Ketchup | 45.04 | 2.44 | 1.13 | 43.91 | 1.31 | 2.98 | 2.6 | 66.8% |
| | Mustard | 40.14 | 1.95 | 1.19 | 38.95 | 0.76 | 1.95 | 1.1 | 60.0% |
| | Mayonnaise | 38.48 | 2.09 | 1.14 | 37.34 | 0.95 | 2.54 | 1.0 | 52.5% |
| | Spagetti Sauce | 43.66 | 1.89 | 1.05 | 42.61 | 0.84 | 1.97 | 0.3 | 27.6% |
| 1% S-2005/PTFE 1:1 Ratio | Jelly | 39.17 | 9.96 | 1.29 | 37.88 | 8.67 | 22.89 | −0.4 | −5.1% |
| | Ketchup | 41.37 | 5.64 | 1.26 | 40.11 | 4.38 | 10.92 | −0.4 | −11.2% |
| | Mustard | 41 | 4.14 | 1.45 | 39.55 | 2.69 | 6.80 | −0.8 | −41.6% |
| | Mayonnaise | 42.16 | 3.4 | 1.38 | 40.78 | 2.02 | 4.95 | −0.1 | −6.6% |
| | Spagetti Sauce | 43.45 | 4.48 | 1.34 | 42.11 | 3.14 | 7.46 | −2.0 | −170.7% |

As shown in Table 3, Pouch A demonstrated an approximate 63% reduction in the amount of residual material retained by the pouch as compared to the control. Pouch C demonstrated a reduction of approximately 44% as compared to the control, Pouch B conversely exhibited an approximate 23% increase in residual material.

Example 9

Pouches D-G were prepared from PP and the following additives: (a) EFEP (1% by weight) ("Pouch D"); (b) PTFE (1% by weight, "Pouch E"); (c) EFEP/FEP (1% by weight, "Pouch F"); and (d) EFEP/PTFE (1% by weight, "Pouch G"). For Pouch F, pouches were prepared with varying ratios of the EFEP to FEP (4:1 and 7:1). Similarly, for Pouch G, pouches were prepared with varying ratios of the EFEP to PTFE (1:1, 4:1, and 7:1). Control pouches were prepared from PP alone; no additives were included in the control pouch composition.

Pouches D-G and the control pouches were filled with wet cat food (FANCY FEAST available from Nestlé USA, Glendale, Calif.) in accordance with the protocol described for the Sauce Retention Test of Example 8. Approximately 24 hours after sealing the pouches, the contents weight, residual weight and residual percentages for each of the pouches/contents type were calculated as described in Example 8. Derived residual percentages were based on the remaining content divided by content weight.

Figure 7:
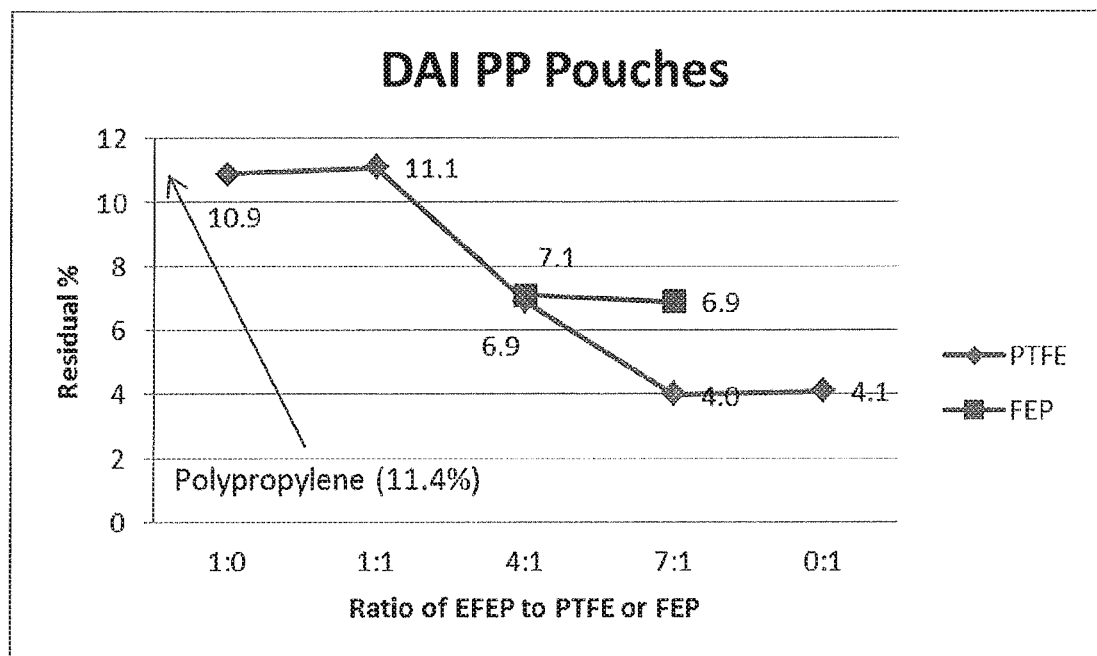
FIG. 7. Plotted residual percentages for Pouches D-G and the control. The diamond plot line shows residual percentages for a pouch formed of PP as a primary polymer and various combinations of EFEP+FEP as additive polymers. The box plot line shows residual percentages for a pouch formed of PP as a primary polymer and various combinations of EFEP+PTFE as additive polymers. The control pouch had a residual percentage of approximately 11.4% (indicated by the arrow).

FIG. 7 shows plotted residual percentages for Pouches D-G and the control. The diamond plot line shows residual percentages for a pouch formed of PP as a primary polymer and various combinations of EFEP+FEP as additive polymers. The box plot line shows residual percentages for a pouch formed of PP as a primary polymer and various combinations of EFEP+PTFE as additive polymers. The control pouch had a residual percentage of approximately 11.4% (indicated by the arrow).

The PP/EFEP+PTFE material performed similarly to the control pouch at EFEP to PTFE ratios of 1:0 (Pouch D, residual percentage=10.9%) and 1:1 (Pouch G, residual percentage=11.1%). As the proportion of PTFE decreased, there was a corresponding decrease in the residual percentage value. For example, for EFEP/PTFE (4:1, Pouch G), the residual percentage was approximately 6.9% and for EFEP/PTFE (7:1, Pouch G), it was 4.0%. Thus, the PP/EFEP PTFE composition (Pouch G) exhibited a residual percentage reduction of between around 38% and 64% (as compared to the control) as ratios of EFEP to PTFE changed from 4:1 to 7:1.

The PP/EFEP+FEP material (Pouch F) showed a reduction in residual percentage from 7.1% (4:1) and 6.9% (7:1). Thus, Pouch F exhibited a residual percentage reduction of between around 36% and 38% as ratios of EFEP to FEP changed from 4:1 to 7:1. The examples demonstrate that additive polymer combinations of EFEP/PTFE and EFEP/FEP in ratios ranging from 4:1 to 7:1, respectively, produce materials that enhance evacuation of contents and minimize surface adhesion.

Figure 8:
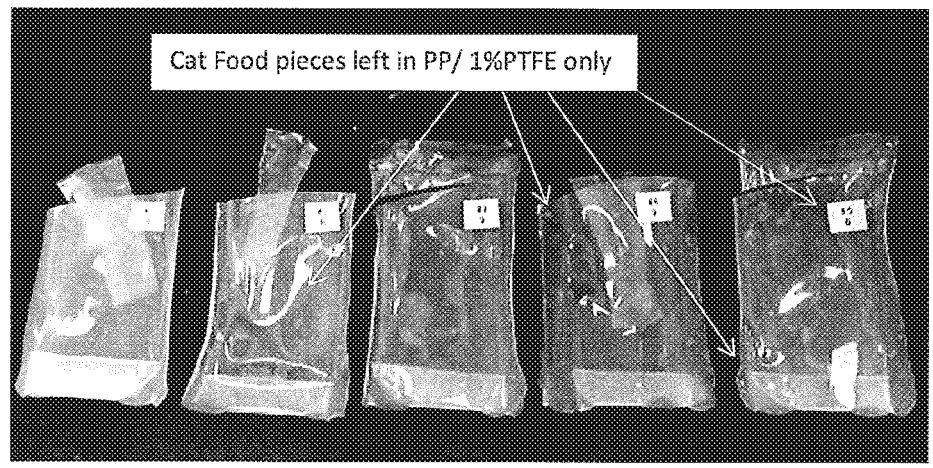
FIG. 8. Adherence of wet cat food pieces pouches prepared from 1% PTFE in PP.
Figure 9:
FIG. 9. Adherence of wet cat food pieces to samples prepared from 1% EFEP/PTFE (7:1) in PP.

Visual inspections of the pouches confirmed the above findings and also confirmed the finding that PP compositions that include EFEP/PTFE (7:1) as the additive polymer provide superior results to PTFE alone as the additive polymer. For example, as shown in FIGS. 8-9, wet cat food pieces were detected on pouches formed from 1% PTFE in PP (FIG. 8), whereas no such pieces were detected on pouches formed of 1% EFEP/PTFE (7:1) in PP (FIG. 9).

Example 10

Pouches H and I were prepared from PET and the following additives: (a) FEP (1% by weight) ("Pouch H"); and (b) PTFE (1% by weight, "Pouch I"). Control pouches were prepared from PET alone; no additives were included in the control pouch composition.

Contact Angle Test

Because the release of water from a substrate is related to the static water contact angle formed with the substrate, a contact angle test was undertaken. Contact angles were measured using a KSV Cam 200 instrument. During the test, a 2 μL drop of deionized water was applied to the pouches. Ten successive photographs were taken every 3 seconds and the contact angles were calculated from the average measurements yielded by the ten photographs.

Table 4 lists the results of the static water contact angle measurements. The contact angle was inversely proportional to an amount of water likely to be retained on the surface of the material. As shown, the water contact angle of Pouch H was approximately 31.5 degrees greater than that formed by the control material. Pouch I formed a water contact angle that was 20.3 degrees greater than that formed by the control material.

TABLE 4

|  | Contact Angle (degrees) |
|---|---|
| PET (control) | 63.2 |
| PET + 1% FEP (Pouch H) | 94.7 |
| PET + 1% PTFE (Pouch I) | 83.5 |

Examples Related to Electric Wire

The respective parameters in the following examples and comparative examples were determined as follows.

Melting Point

The melting point was defined as the temperature corresponding to the maximum value on a heat-of-fusion curve with a temperature-increasing rate of 10° C./min using a DSC device (Seiko Instruments Inc.).

Average Particle Size

The average particle size was defined as the value corresponding to 50% of the cumulative particle size distribution obtained using a laser diffraction particle size analyzer.

The materials used in the following examples and comparative examples were as follows.

Fluorine-Free Resin (Base Resin)

Polyamide: Ultramid(R) B29 HM 01, BASF (melting point: 220° C.)
Polyethylene: NUC-9060, NUC Corp. (melting point: 109° C.)
Polyvinyl chloride: Kane Ace 1003N, Kaneka Corp. (average degree of polymerization: 1300)
Plasticizer: diisononyl phthalate (DINP)
Thermal stabilizer: ADK STAB RUP-109, Adeka Corp.
Flame retardant: SZB-2335, Sakai Chemical Industry Co., Ltd.

(Fluorine-Containing Polymer)

PTFE: low molecular weight PTFE Lubron L5F, Daikin Industries, Ltd.
PFA: NEOFLON PFA AD-2, Daikin Industries, Ltd.
FEP: NEOFLON FEP NP-20, Daikin Industries, Ltd.
low melting point FEP (melting point: 225° C.)
ETFE: NEOFLON ETFE EP-521, Daikin Industries, Ltd.
NEOFLON ETFE EP-620, Daikin Industries, Ltd.
EFEP: NEOFLON EFEP RP-5000, Daikin Industries, Ltd.
PVdF: KF-7200, Kureha Corp.

The PFA, FEP, ETFE, EFEP, and PVdF were pulverized so as to have an average particle size of 20 μm.

For NP-20, a pulverized matter having an average particle size of 5 μm was also prepared by the same pulverizing method.

Table 5 shows the melting points and average particle sizes of the fluorine-containing polymers.

TABLE 5

| | F polymer | | | | | | | |
|---|---|---|---|---|---|---|---|---|
| | | | FEP | | | | | |
| | PTFE | PFA | | Low melting point | ETFE | | EFEP | PVdF |
| F polyemer | L5F | AD-2 | NP-20 | FEP | EP-521 | EP-620 | RP-5000 | KF-7200 |
| Melting point (° C.) | 329 | 313 | 264 | 225 | 263 | 220 | 202 | 173 |
| Average particie size (μm) | 2 | 20 | 20 and 5 | 20 | 20 | 20 | 20 | 20 |

Silicone Oil

Silicone oil: SH200-1000CS, Dow Corning Toray Co., Ltd. (weight average molecular weight: 1,000 to 1.0,000)

With the respective base resins, samples of the examples and comparative examples were prepared as follows.

Polyamide

Preparation of Masterbatch

One of the fluorine-containing polymers or silicone oil was mixed with Polyamide 6 (B29 HM 01, BASF) such that the amount of the fluorine-containing polymer or silicone oil was 20 wt % relative to 100 parts by weight of Polyamide 6. The mixture was processed in a twin-screw extruder (Labo Plastomill 30C150, Toyo Seiki Seisaku-sho, Ltd.) at a screw rotation speed of 1.00 rpm, whereby pellets containing the fluorine-containing polymer or silicone oil was prepared. The temperature conditions for extrusion were as follows.
Cylinder temperature: 230° C., 240° C., and 250° C.
Die temperature: 250° C.

Preparation of Strand

Polyamide 6 (B29 HM 01, BASF) and the masterbatch prepared above were mixed such that the amount of the fluorine-containing polymer or silicone oil was as shown in Table 6 relative to 100 parts by weight of the polyamide. The mixture was processed in a twin-screw extruder (Labo Plastomill 30C150, Toyo Seiki Seisaku-sho, Ltd.), whereby a strand was prepared. The temperature conditions for extrusion and the screw rotation speed were as follows.
Cylinder temperature: 230° C., 240° C., and 250° C.
Die temperature: 270° C.
Screw rotation speed: 10 rpm Polyethylene Preparation of Masterbatch One of the fluorine-containing polymers or silicone oil was mixed with polyethylene (NUC-9060, NUC Corp.) such that the amount of the fluorine-containing polymer or silicone oil was 20 wt % relative to 100 parts by weight of the polyethylene. The mixture was processed in a twin-screw extruder (Labo Plastomill 30C150, Toyo Seiki Seisaku-sho, Ltd.) at a screw rotation speed of 100 rpm, whereby pellets containing the fluorine-containing polymer or silicone oil was prepared. The temperature conditions for extrusion were as follows.
Cylinder temperature: 200° C., 200° C., and 200° C.
Die temperature: 200° C.

Preparation of Strand

Polyethylene (NUC-9060, NUC Corp.) and the masterbatch prepared above were mixed such that the amount of the fluorine-containing polymer or silicone oil was as shown in Table 7 relative to 100 parts by weight of the polyethylene. The mixture was processed in a twin-screw extruder (Labo Plastomill 30C150, Toyo Seiki Seisaku-sho, Ltd.), whereby a strand was prepared. The temperature conditions for extrusion and the screw rotation speed were as follows.
Cylinder temperature: 200° C., 200° C., and 210° C.
Die temperature: 220° C.
Screw rotation speed: 10 rpm Polyvinyl Chloride Preparation of Strand Polyvinyl chloride (Kane Ace 1003N, Kaneka Corp.), a plasticizer (DINP), a thermal stabilizer (ADK STAB RUP-109, Adeka Corp.), a flame retardant (SZB-2335, Sakai Chemical Industry Co., Ltd.), and one of the fluorine-containing polymers or silicone oil were mixed such that the amounts thereof were as shown in Table 8 relative to 100 parts by weight of the polyvinyl chloride. The mixture was then kneaded (roll temperature: 160° C., 5 minutes) and the kneaded product was cut into pellets. The pellets were processed in a twin-screw extruder (Labo Plastomill 30C150, Toyo Seiki Seisaku-sho, Ltd.), whereby a strand was prepared. The temperature conditions for extrusion and the screw rotation speed were as follows.
Cylinder temperature: 160° C., 170° C., and 180° C.
Die temperature: 130° C.
Screw rotation speed: 10 rpm For the samples produced above, the coefficient of static he workability of insertion into a pipe, the surface roughness Ra, the appearance, and the storage stability were determined or evaluated as follows. The results are shown in Tables 6 to 8.

Coefficient of Static Friction

The coefficient of static friction was determined using a surface property tester and a stainless steel plate (1 cm$^2$) serving as a friction element accordance with ASTM D1894.

Workability of Insertion into Pipe

When the base resin was polyamide, the cases where the coefficient of static friction was 0.28 or lower were evaluated as excellent, higher than 0.28 and not higher than 0.32 as good, and higher than 0.32 as poor.
When the base resin was polyethylene, the cases where the coefficient of static friction was 0.20 or lower were evaluated as excellent, higher than 0.20 and not higher than 0.22 as good, and higher than 0.22 as poor.
When the base resin was polyvinyl chloride, the cases where coefficient of static friction was 0.32 or lower were evaluated as excellent, higher than 0.32 and not higher than 0.36 as good, and higher than 0.36 as poor, Surface Roughness Ra The surface roughness Ra (unit: μm) was determined by observing the surface of each sample using a laser microscope (Keyence Corp.) at 110× magnification.

Appearance

The cases where the surface roughness Ra was 2.0 μm or smaller were evaluated as excellent, higher than 2.0 and not higher than 5.0 μm as good, and greater than 5.0 μm as poor.

Storage Stability

The samples were stored at room temperature for 24 hours. Then, the surfaces thereof were touched with a hand, and samples without stickiness on the surface were evaluated as good, while samples with stickiness on the surface were evaluated as poor.

TABLE 6

| | | Ex. A-1 | Ex. A-2 | Ex. A-3 | Ex. A-4 | Ex. A-5 | Ex. A-6 | Ex. A-7 | Ex. A-8 | Ex. A-9 | Ex. A-10 |
|---|---|---|---|---|---|---|---|---|---|---|---|
| Polyamide | PAS | 100 | 100 | 100 | 100 | 100 | 100 | 100 | 100 | 100 | 100 |
| PTFE | L5F | 1.0 | | | | | | | | | 0.5 |
| PFA | AD-2 | | 1.0 | | | | | | | | |
| FEP | NP-20 | | | 1.0 | | | | | | | |
| | NP-20 (smaller size) | | | | 1.0 | | | | | | |
| | ND-1L | | | | | 1.0 | | | | | |
| ETFE | EP-521 | | | | | | 1.0 | | | | |
| | EP-820 | | | | | | | 1.0 | | | |
| EFEP | RP-5000 | | | | | | | | 1.0 | | |
| PVdF | KF-7200 | | | | | | | | | 1.0 | |
| Silicone oil | SH200-1000CS | | | | | | | | | | |

TABLE 6-continued

|  |  | Ex. A-11 | Ex A-12 | Ex. A-13 | Comp. A-1 | Comp. A-2 | Comp. A-3 | Comp. A-4 | Comp. A-5 | Comp. A-6 | Comp. A-7 |
|---|---|---|---|---|---|---|---|---|---|---|---|
| Coefficient of static friction | | 0.27 | 0.27 | 0.28 | 0.28 | 0.29 | 0.28 | 0.29 | 0.29 | 0.31 | 0.29 |
| Workability of insertion into pipe | | Excellent | Excellent | Excellent | Excellent | Good | Excellent | Good | Good | Good | Good |
| Surface roughness Ra (μm) | | 2.80 | 2.12 | 1.36 | 0.99 | 0.97 | 1.21 | 0.83 | 0.90 | 0.58 | 2.21 |
| Appearance | | Good | Good | Excellent | Excellent | Excellent | Excellent | Excellent | Excellent | Excellent | Good |
| Storage stability (r.t * 24 h) | | Good | Good | Good | Good | Good | Good | Good | Good | Good | Good |

|  |  | Ex. A-11 | Ex A-12 | Ex. A-13 | Comp. A-1 | Comp. A-2 | Comp. A-3 | Comp. A-4 | Comp. A-5 | Comp. A-6 | Comp. A-7 |
|---|---|---|---|---|---|---|---|---|---|---|---|
| Polyamide | PAS | 100 | 100 | 100 | 100 | 100 | 100 | 100 | 100 | 100 | 100 |
| PTFE | L5F | 3.0 | | | | 0.2 | 5.0 | | | | |
| PFA | AD-2 | | | | | | | | | | |
| FEP | NP-20 | | | | | | | | | | |
|  | NP-20 (smaller size) | | 0.5 | 3.0 | | | | 0.2 | 5.0 | | |
|  | ND-1L | | | | | | | | | | |
| ETFE | EP-521 | | | | | | | | | | |
|  | EP-820 | | | | | | | | | | |
| EFEP | RP-5000 | | | | | | | | | | |
| PVdF | KF-7200 | | | | | | | | | | |
| Silicone oil | SH200-1000CS | | | | | | | | | 1.0 | 5.0 |
| Coefficient of static friction | | 0.20 | 0.30 | 0.28 | 0.34 | 0.34 | 0.18 | 0.34 | 0.19 | 0.31 | 0.30 |
| Workability of insertion into pipe | | Excellent | Good | Excellent | Poor | Poor | Excellent | Poor | Excellent | Good | Good |
| Surface roughness Ra (μm) | | 5.00 | 0.76 | 2.00 | 0.54 | 0.55 | 15.24 | 0.54 | 14.54 | 0.66 | 0.80 |
| Appearance | | Good | Excellent | Excellent | Excellent | Excellent | Poor | Excellent | Poor | Excellent | Excellent |
| Storage stability (r.t * 24 h) | | Good | Good | Good | Good | Good | Good | Good | Good | Poor | Poor |

TABLE 7

|  |  | Ex. B-1 | Ex. B-2 | Ex. B-3 | Ex. B-4 | Ex. B-5 | Ex. B-6 | Ex. B-7 | Ex. B-8 | Ex. B-9 | Ex. B-10 |
|---|---|---|---|---|---|---|---|---|---|---|---|
| Polyamide | LDPE | 100 | 100 | 100 | 100 | 100 | 100 | 100 | 100 | 100 | 100 |
| PTFE | L5F | 1.0 | | | | | | | | | 0.5 |
| PFA | AD-2 | | 1.0 | | | | | | | | |
| FEP | NP-20 | | | 1.0 | | | | | | | |
|  | NP-20 (smaller size) | | | | 1.0 | | | | | | |
|  | ND-1L | | | | | 1.0 | | | | | |
| ETFE | EP-521 | | | | | | 1.0 | | | | |
|  | EP-820 | | | | | | | 1.0 | | | |
| EFEP | RP-5000 | | | | | | | | 1.0 | | |
| PVdF | KF-7200 | | | | | | | | | 1.0 | |
| Silicone oil | SH200-1000CS | | | | | | | | | | |
| Coefficient of static friction | | 0.18 | 0.19 | 0.19 | 0.19 | 0.20 | 0.19 | 0.20 | 0.20 | 0.22 | 0.21 |
| Workability of insertion into pipe | | Excellent | Excellent | Excellent | Excellent | Excellent | Excellent | Excellent | Excellent | Good | Good |
| Surface roughness Ra (μm) | | 2.52 | 2.41 | 1.90 | 1.81 | 1.82 | 1.95 | 1.87 | 1.53 | 0.86 | 2.01 |
| Appearance | | Good | Good | Excellent | Excellent | Excellent | Excellent | Excellent | Excellent | Excellent | Good |
| Storage stability (r.t * 24 h) | | Good | Good | Good | Good | Good | Good | Good | Good | Good | Good |

|  |  | Ex. B-11 | Ex B-12 | Ex. B-13 | Comp. B-1 | Comp. B-2 | Comp. B-3 | Comp. B-4 | Comp. B-5 | Comp. B-6 | Comp. B-7 |
|---|---|---|---|---|---|---|---|---|---|---|---|
| Polyamide | LDPE | 100 | 100 | 100 | 100 | 100 | 100 | 100 | 100 | 100 | 100 |
| PTFE | L5F | 2.0 | | | | 0.2 | 5.0 | | | | |
| PFA | AD-2 | | | | | | | | | | |
| FEP | NP-20 | | | | | | | | | | |
|  | NP-20 (smaller size) | | 0.5 | 2.0 | | | | 0.2 | 5.0 | | |
|  | ND-1L | | | | | | | | | | |
| ETFE | EP-521 | | | | | | | | | | |
|  | EP-820 | | | | | | | | | | |
| EFEP | RP-5000 | | | | | | | | | | |
| PVdF | KF-7200 | | | | | | | | | | |
| Silicone oil | SH200-1000CS | | | | | | | | | 1.0 | 5.0 |

TABLE 7-continued

| | | | | | | | | | | |
|---|---|---|---|---|---|---|---|---|---|---|
| Coefficient of static friction | 0.17 | 0.22 | 0.18 | 0.24 | 0.24 | 0.17 | 0.24 | 0.20 | 0.21 | 0.20 |
| Workability of insertion into pipe | Excellent | Good | Excellent | Poor | Poor | Excellent | Poor | Excellent | Good | Excellent |
| Surface roughness Ra (μm) | 4.29 | 1.34 | 3.34 | 0.77 | 0.78 | 16.24 | 0.77 | 13.41 | 0.80 | 0.82 |
| Appearance | Good | Excellent | Good | Excellent | Excellent | Poor | Excellent | Poor | Excellent | Excellent |
| Storage stability (r.t * 24 h) | Good | Good | Good | Good | Good | Good | Good | Good | Poor | Poor |

TABLE 8

| | | Ex. C-1 | Ex. C-2 | Ex. C-3 | Ex. C-4 | Comp. C-1 | Comp. C-2 | Comp. C-3 | Comp. C-4 |
|---|---|---|---|---|---|---|---|---|---|
| PVC | 1003N | 100 | 100 | 100 | 100 | 100 | 100 | 100 | 100 |
| Plasticizer | DINP | 50 | 50 | 50 | 40 | 50 | 80 | 50 | 50 |
| Thermal stabilizer | RUP-109 | 5 | 5 | 5 | 5 | 5 | 5 | 5 | 5 |
| Flame retardant | SZB-2335 | 10 | 10 | 10 | 10 | 10 | 10 | 10 | 10 |
| PTFE | L5F | 1.0 | | | | | | | |
| FEP | NP-20 (smaller size) | | 1.0 | | | | | | |
| ETFE | EP-620 | | | 1.0 | 2.0 | | 0.2 | 5.0 | |
| Silicone oil | SH200-1000CS | | | | | | | | 5.0 |
| Coefficient of static friction | | 0.34 | 0.35 | 0.35 | 0.32 | 0.39 | 0.39 | 0.30 | 0.34 |
| Workability of insertion into pipe | | Good | Good | Good | Excellent | Poor | Poor | Excellent | Good |
| Surface roughness Ra (μm) | | 2.82 | 1.88 | 1.80 | 2.45 | 1.71 | 1.72 | 7.21 | 1.84 |
| Appearance | | Good | Excellent | Excellent | Good | Excellent | Excellent | Poor | Excellent |
| Storage stability (r.t. * 24 h) | | Good | Good | Good | Good | Good | Good | Good | Poor |

G. OTHER EMBODIMENTS

The present disclosure also relates to the following (1) to (68).

(1) A thermoplastic and fluoropolymer blend, comprising:
  (a) a fluoropolymer fraction that is up to about 2% w/w of the blend; and
  (b) a thermoplastic fraction;
wherein the combined fluoropolymer fraction and thermoplastic fraction is at least 80% w/w of the blend.

(2) The blend of (1), wherein the blend has a water contact angle that is at least about 20° greater than a contact angle on the thermoplastic alone.

(3) Any one of the blends above, wherein when said blend is extruded to form a workpiece the workpiece shows less than about 0.5% weight loss of a vegetable oil when tested according to DOT Appendix B part 173.

(4) Any one of the blends above, wherein when said blend is extruded to form a workpiece, the workpiece has a total extractable metals less than about 4.0 ppb w/w when extracted in 5% w/w aqueous hydrofluoric acid solution according to the Extracted Metal Test of Example 2.

(5) Any one of the blends above, wherein when said blend is extruded to form a workpiece, the workpiece has a total extractable metals equal to or less than about 1.5, 1, or 0.5 ppb w/w when extracted in 5% w/w aqueous hydrofluoric acid solution according to the Extracted Metal Test of Example 2.

(6) Any one of the blends above, wherein when said blend is extruded to form a workpiece, the workpiece is a film, and wherein the film does not significantly adhere to acrylic or rubber based adhesive after being in contact with the adhesive for 48 h at 100° F. (38° C.) according to the Tensile Strength Test of Example 3.

(7) Any one of the blends above, wherein when said blend is extruded to form a workpiece, the workpiece retains equal to or less than about 7% wet cat food according to the Cat Food Retention Test of Example 4.

(8) Any one of the blends above, wherein when said blend is extruded to form a workpiece, the workpiece retains less than about 5% wet cat food according to the Cat Food Retention Test of Example 4.

(9) Any one of the blends above, wherein when said blend is extruded to form a workpiece, the workpiece exerts no more than about 2 mPa of stress according to Extruding Fixture Friction Test of Example 5.

(10) Any one of the blends above, wherein when said blend is extruded to form a workpiece, the workpiece resists soil according to AATCC Test Method 122-2013, Appendix A.

(11) Any one of the blends above, wherein when said blend is extruded to form a workpiece, the workpiece retains less than about 15% jelly under the testing conditions described herein in Example 8.

(12) Any one of the blends above, wherein when said blend is extruded to form a workpiece, the workpiece retains less than about 3% of a sauce according to the Sauce Retention Test of Example 8, said sauce selected from the group consisting of: ketchup, mustard, mayonnaise, and marinara sauce.

(13) Any one of the blends above, wherein when said blend is extruded to form a workpiece, the workpiece displays a contact angle with water of at least about 80°.

(14) A process of manufacturing an extruded polymer workpiece, the process comprising:
  (a) mixing a thermoplastic fraction and up to about 2% w/w of a fluoropolymer fraction to produce a blend, wherein the combined fluoropolymer fraction and thermoplastic fraction is at least 80% w/w of the blend;
  (b) heating the thermoplastic resin to above the melting temperature of the thermoplastic fraction but below the melting temperature of the fluoropolymer fraction, either before or after step (a);
  (c) extruding the blend to form an extruded workpiece; and
  (d) cooling the extruded workpiece below the melting temperature of the blend.

(15) Any one of the blends or processes above, wherein the thermoplastic fraction has a lower melting point than the fluoropolymer fraction.
(16) Any one of the blends or processes above, wherein the fluoropolymer fraction comprises a plurality of particles not exceeding about 150 µm in diameter.
(17) Any one of the blends or processes above, wherein the fluoropolymer fraction consists of a plurality of particles not exceeding about 150 µm in diameter.
(18) Any one of the blends or processes above, wherein the fluoropolymer fraction comprises a plurality of particles not exceeding about 60 µm in diameter.
(19) Any one of the blends or processes above, wherein the fluoropolymer fraction consists of a plurality of particles not exceeding about 60 µm in diameter.
(20) Any one of the blends or processes above, wherein the plurality of particles have a mean size of about 5-15 µm.
(21) Any one of the blends or processes above, wherein the plurality of particles have a mean size of about 5-10 µm.
(22) Any one of the blends or processes above, wherein the w/w percentage of the combined thermoplastic and fluoropolymer fractions of the blend is at least a value selected from the group consisting of: 85, 90, 95, 96, 97, 98, 99, 99,9, and 100%.
(23) Any one of the blends or processes above, wherein the fluoropolymer fraction is present at a w/w concentration selected from: 100 ppm, 200 ppm, 300 ppm, 400 ppm, 500 ppm, 600 ppm, 700 ppm, 800 ppm, 900 ppm, 0.1%, 0.2%, 0.3%, 0.4%, 0.5%, 0.6%, 0.7%, 0.8%, 0.9%, 1.0%, 1.1%. 1.2%, 1.3%, 1.4%, 1.5%, 1.6%, 1.7%, 1.8%, 1.9%, 2.0%, about any of the foregoing, and a range between any two of the foregoing.
(24) Any one of the blends or processes above, wherein the thermoplastic fraction comprises a thermoplastic selected from the group consisting of: polyethylene (PE), high-density polyethylene (HDPE), low-density polyethylene (LDPE), highly linear HDPE (HL HDPE), linear LDPE (LLDPE), polyvinyl chloride (PVC), polypropylene (PP), polyamide, polyamide 6 (PA-6), and polyethylene terephthalate (PET).
(25) The blend or process of (24), wherein the thermoplastic fraction consists of one or more thermoplastics selected from the group consisting of: PE, HDPE, LOPE, HL HDPE, LLDPE, PVC, PP, polyamide, PA-6, and PET.
(26) Any one of the blends or processes above, wherein the fluoropolyrner fraction comprises up to 10% w/w of a perfluoro vinyl ether.
(27) Any one of the blends or processes above, wherein the fluoropolymer fraction comprises a fluoropolymer comprising monomers selected from the group consisting of: tetrafluoroethylene, hexafluoropropylene, and ethylene,
(28) Any one of the blends or processes above, wherein the fluoropolymer fraction comprises a fluoropolymer selected from the group consisting of: NEOFLON EFEP (Daikin Industries, Osaka, Japan—"EFEP"), polytetrafluoroethylene ("PTFE"), fluorinated ethylene propylene ("FEP"), and a polymer comprising a fluorinated polyacrylate ester monomer.
(29) Any one of the blends or processes above, wherein the fluoropolymer fraction consists of one or more fluoropolymers selected from the group consisting of: EFEP, PTFE, FEP, and a polymer comprising a fluorinated polyacrylate ester monomer.
(30) Any one of the blends or processes above, wherein the fluoropolymer fraction comprises two fluoropolyrners selected from the group consisting of: EFEP, PTFE, and a polymer comprising a fluorinated polyacrylate ester monomer, at a relative w/w ratio from 1:6-6:1.
(31) Any one of the blends or processes above, wherein the fluoropolymer fraction consists of two fluoropolymers selected from the group consisting of: EFEP, PTFE, FEP, and a polymer comprising a fluorinated polyacrylate ester monomer, at a relative w/w ratio from 1:6-6:1.
(32) Any one of the blends or processes above, wherein the fluoropolymer fraction comprises a fluorine-containing polymer containing a fluorine-containing acrylate ester monomer having the structure

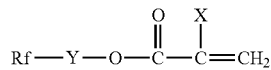

wherein
X is hydrogen, methyl, fluoro, chloro, bromo, iodo, $CFX^1X^2$ (wherein $X^1$ and $X^2$ are each hydrogen, fluoro, chloro, bromo, or iodo), cyano, straight-chain or branched fluoroalkyl having 1 to 21 carbon atoms, substituted or unsubstituted benzyl, or substituted or unsubstituted phenyl;
Y is an aliphatic group having 1 to 10 carbon atoms; and
Rf is a straight-chain or branched fluoroalkyl or fluoroalkenyl group having 1 to 6 carbon atoms.
(33) Any one of the blends or processes above, wherein the thermoplastic mainly comprises HDPE and the fluoropolymer additive mainly comprises a fluorine-containing polymer having repeating units derived from a fluorine-containing acrylate ester; and FEP.
(34) Any one of the blends or processes of (1)-(29), wherein the thermoplastic fraction mainly comprises HOPE and the fluoropolymer fraction mainly comprises a fluorine-containing polymer having repeating units derived from a fluorine-containing acrylate ester; and EFEP.
(35) Any one of the blends or processes of (1)-(29), wherein the thermoplastic fraction mainly comprises HOPE and the fluoropolymer fraction mainly comprises a fluorine-containing polymer having repeating units derived from a fluorine-containing acrylate ester; and PTFE.
(36) Any one of the blends or processes of (1)-(29), wherein the thermoplastic fraction mainly comprises HL HOPE and the fluoropolymer fraction mainly comprises a fluorine-containing polymer having repeating units derived from a fluorine-containing acrylate ester; and FEP.
(37) Any one of the blends or processes of (1)-(29), wherein the thermoplastic fraction mainly comprises LOPE and the fluoropolymer additive mainly comprises one or more of EFEP, PTFE, and a fluorine-containing polymer having repeating units derived from a fluorine-containing acrylate ester.
(38) Any one of the blends or processes of (1)-(29), wherein the thermoplastic fraction mainly comprises PP and the fluoropolymer fraction mainly comprises one or more of FEP, PTFE, and EFEP.
(39) Any one of the blends or processes of (1)-(29), wherein the thermoplastic fraction mainly comprises PA-6 and the fluoropolymer fraction mainly comprises FEP or PTFE.
(40) Any one of the blends or processes of (1)-(29), wherein the thermoplastic fraction mainly comprises PVC and the fluoropolymer fraction mainly comprises a fluorinated polyacrylate ester.
(41) Any one of the blends or processes of (1)-(29), wherein the thermoplastic fraction mainly comprises LLDPE; the fluoropolymer fraction mainly comprises EFEP, PTFE, or a combination of both; the thermoplastic fraction is present in the blend at about 99% w/w; and the fluoropolymer fraction is present in the blend at about 1% w/w.

(42) Any one of the blends or processes of (1)-(29), wherein the thermoplastic fraction mainly comprises PP; the fluoropolymer fraction mainly comprises EFEP; the thermoplastic fraction is present in the blend at about 99% w/w; and the fluoropolymer fraction is present in the blend at about 1% w/w.

(43) Any one of the blends or processes of (1)-(29), wherein the thermoplastic fraction mainly comprises PP; the fluoropolymer fraction mainly comprises PTFE; the thermoplastic fraction is present in the blend at about 99% w/w; and the fluoropolymer fraction is present in the blend at about 1% w/w.

(44) Any one of the blends or processes of (1)-(29), wherein the thermoplastic fraction mainly comprises PP; the fluoropolymer fraction mainly comprises EFEP and FEP at a relative w/w ratio of about 4:1, 5:1, 6:1, or 7:1; the thermoplastic fraction is present in the blend at about 99% w/w; and the fluoropolymer fraction is present in the blend at about 1% w/w.

(45) Any one of the blends or processes of (1)-(29), wherein the thermoplastic fraction mainly comprises PP; the fluoropolymer fraction mainly comprises EFEP and PTFE at a relative w/w ratio of about 4:1, 5:1, 6:1, or 7:1; the thermoplastic fraction is present in the blend at about 99% w/w; and the fluoropolymer fraction is present in the blend at about 1% w/w.

(46) Any one of the blends or processes of (1)-(29), wherein the thermoplastic fraction mainly comprises PET; the fluoropolymer fraction mainly comprises FEP; the thermoplastic fraction is present in the blend at about 99% w/w; and the fluoropolymer fraction is present in the blend at about 1% w/w.

(47) Any one of the blends or processes of (1)-(29), wherein the thermoplastic fraction mainly comprises PET; the fluoropolymer fraction mainly comprises PTFE; the thermoplastic fraction is present in the blend at about 99% w/w; and the fluoropolymer fraction is present in the blend at about 1% w/w.

(48) An extruded workpiece comprising the blend of any one of (1) and (3)-(47).

(49) An extruded workpiece that is the product of the process of any one of (1) and (3)-(48).

(50) The extruded workpiece of any one of (48)-(49), comprising surface protrusions enriched in fluoropolymer content.

(51) The extruded workpiece of any one of (48)-(50), comprising surface protrusions enriched in fluoropolymer content of about 5-25 μm diameter.

(52) The extruded workpiece of any one of (48)-(51), wherein the thermoplastic fraction mainly comprises PA-6 and the workpiece is one of an electrical wire insulation coating and a hydraulic hose mold.

(53) The extruded workpiece of any one of (48)-(52), wherein the thermoplastic fraction mainly comprises HDPE and the workpiece is a food package.

(54) The extruded workpiece of any one of (48)-(53), wherein the thermoplastic fraction mainly comprises HDPE and the workpiece is a bottle or a food pouch.

(55) The extruded workpiece of any one of (48)-(51), wherein the workpiece shows less than about 0.5% weight loss of a vegetable oil when tested according to DOT Appendix B part 173.

(56) The extruded workpiece of any one of (48)-(55), wherein the workpiece has a total extractable metals less than about 4.0 ppb w/w when extracted in 5% w/w aqueous hydrofluoric acid solution according to the Extracted Metal Test of Example 2.

(57) The extruded workpiece of any one of (48)-(56), wherein when said workpiece has a total extractable metals equal to or less than about 1.5, 1, or 0.5 ppb w/w when extracted in 5% w/w aqueous hydrofluoric acid solution according to the Extracted Metal Test of Example 2.

(58) The extruded workpiece of any one of (48)-(57), wherein the workpiece is a film, and wherein the film does not significantly adhere to acrylic or rubber based adhesive after being in contact with the adhesive for 48 h at 100° F. (38° C.) according to the Tensile Strength Test of Example 3.

(59) The extruded workpiece of any one of (48)-(58), wherein the workpiece retains equal to or less than about 7% wet cat food according to the Cat Food Retention Test of Example 4.

(60) The extruded workpiece of any one of (48)-(59), wherein the workpiece retains less than about 5% wet cat food according to the Cat Food Retention Test of Example 4.

(61) The extruded workpiece of any one of (48)-(60), wherein the workpiece retains less than about 5% wet cat food according to the Sauce Retention Test of Example 8.

(62) The extruded workpiece of any one of (48)-(61), wherein the workpiece exerts no more than about 2 mPa of stress according to Extruding Fixture Friction Test of Example 5.

(63) The extruded workpiece of any one of (48)-(62), wherein the workpiece resists soil according to AATCC Test Method 122-2013, Appendix A.

(64) The extruded workpiece of any one of (48)-(63), wherein the workpiece retains less than about 15% jelly according to the Sauce Retention Test of Example 8.

(65) The extruded workpiece of any one of (48)-(64), wherein the workpiece retains less than about 3% of a sauce according to the Sauce Retention Test of Example 8, said sauce selected from the group consisting of: ketchup, mustard, mayonnaise, and marinara sauce.

(66) The extruded workpiece of any one of (48)-(65), wherein the workpiece displays a contact angle with water of at least about 80°.

(67) The workpiece of any one of (48)-(66), wherein said workpiece has a surface that is hydrophobic and oleophobic.

(68) The blend of any one of (1) and (13)-(48), wherein said blend is hydrophobic and oleophobic.

CONCLUSIONS

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

We claim:

1. A power cable comprising
a core wire and a coating layer covering the core wire,
wherein the power cable is 10 to 1000 V power cable,
the core wire is a core wire with a diameter large than AWG54,
the coating layer consists of a fluorine-free resin, a fluorine-containing crystalline polymer, and optionally an additive selected from the group consisting of a heat-resistance stabilizer, an antioxidant, a flame retardant, and a pigment,
the fluorine-free resin including polyamide 6,
the fluorine-containing crystalline polymer including at least one selected from the group consisting of polytetrafluoroethylene (PTFE), tetrafluoroethylene (TFE)/perfluoro (alkyl vinyl ether) (PAVE) copolymers (PFA), TFE/hexafluoropropylene (HFP) copolymers (FEP), ethylene (Et)/TFE copolymers (ETFE), Et/TFE/HFP copolymers (EFEP), and polyvinylidene fluoride (PVdF),
the fluorine-containing crystalline polymer has an average particle size of 2.0 to 10.0 μm,
the fluorine-containing crystalline polymer has a melting point of 140° C. to 300° C., and
the amount of the fluorine-containing crystalline polymer is 0.5 to 4.0 mass % relative to the fluorine-free resin.

2. The power cable according to claim 1,
wherein the fluorine-containing crystalline polymer is a melt-fabricable, fluorine-containing crystalline polymer.

3. The power cable according to claim 1,
wherein the fluorine-containing crystalline polymer has a melting point ranging from the temperature 20° C. lower than the melting point of the polyamide 6 to the temperature 80° C. higher than the melting point of the polyamide 6.

* * * * *